(12) United States Patent
Pietraski et al.

(10) Patent No.: US 11,716,693 B2
(45) Date of Patent: *Aug. 1, 2023

(54) METHOD AND APPARATUS FOR DATA-SPLITTING TRANSMISSION FROM MULTIPLE SITES

(71) Applicant: INTERDIGITAL PATENT HOLDINGS, INC., Wilmington, DE (US)

(72) Inventors: Philip Pietraski, Jericho, NY (US); Carl Wang, Melville, NY (US); Stephen E. Terry, Northport, NY (US); Samian Kaur, Plymouth Meeting, PA (US); Yingxue Li, San Diego, CA (US); Janet Stern-Berkowitz, Little Neck, NY (US); Kenneth Kearney, Smithtown, NY (US); Douglas Castor, Norristown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,787

(22) Filed: May 12, 2022

(65) Prior Publication Data

US 2022/0272640 A1 Aug. 25, 2022

Related U.S. Application Data

(63) Continuation of application No. 16/843,378, filed on Apr. 8, 2020, now Pat. No. 11,337,160, which is a
(Continued)

(51) Int. Cl.
*H04W 52/14* (2009.01)
*H04B 7/06* (2006.01)
(Continued)

(52) U.S. Cl.
CPC ........ *H04W 52/146* (2013.01); *H04B 7/0617* (2013.01); *H04B 7/0626* (2013.01);
(Continued)

(58) Field of Classification Search
None
See application file for complete search history.

(56) References Cited

U.S. PATENT DOCUMENTS

| 9,008,050 B2 | 4/2015 | Feuersanger et al. |
| 2007/0082692 A1 | 4/2007 | Tirkkonen et al. |

(Continued)

FOREIGN PATENT DOCUMENTS

| EP | 2 763 470 | 8/2014 |
| EP | 2 785 119 | 10/2014 |

(Continued)

OTHER PUBLICATIONS

Alcatel-Lucent Shanghai Bell et al., "Uplink Power Control Considerations for CoMP," 3GPP TSG RAN WG1 Meeting RAN1#65, R1-111433, Barcelona, Spain (May 9-13, 2011).
(Continued)

*Primary Examiner* — Hong Shao
(74) *Attorney, Agent, or Firm* — Volpe Koenig

(57) ABSTRACT

Methods and apparatus for changing cell range coverage are disclosed. A wireless transmit/receive unit (WTRU) may include circuitry configured to transmit subframes of radio frames using a physical uplink shared channel (PUSCH), where the subframes are divided into first and second sets. The circuitry may include a first power control loop utilized for the first set of subframes and a second power control loop utilized for the second set of subframes. The first power control loop may set transmission power levels for transmission over the PUSCH for the first set of subframes, and the second power control loop may set transmission power
(Continued)

levels for transmission over the PUSCH for the second set of subframes. The circuitry may be configured with a first physical uplink control channel (PUCCH) for a first eNodeB and a second PUCCH for a second eNodeB to simultaneously communicate with the first and the second eNodeBs.

10 Claims, 14 Drawing Sheets

Related U.S. Application Data continuation of application No. 15/148,677, filed on May 6, 2016, now abandoned, which is a continuation of application No. 14/118,225, filed as application No. PCT/US2012/038424 on May 17, 2012, now abandoned.

(60) Provisional application No. 61/589,764, filed on Jan. 23, 2012, provisional application No. 61/487,139, filed on May 17, 2011.

(51) Int. Cl.
| | |
|---|---|
| H04W 52/32 | (2009.01) |
| H04W 52/26 | (2009.01) |
| H04W 72/04 | (2023.01) |
| H04W 72/21 | (2023.01) |
| H04W 52/38 | (2009.01) |
| H04L 5/00 | (2006.01) |
| H04W 84/12 | (2009.01) |

(52) U.S. Cl.
CPC ....... *H04W 52/267* (2013.01); *H04W 52/325* (2013.01); *H04W 72/21* (2023.01); *H04L 5/0073* (2013.01); *H04W 52/38* (2013.01); *H04W 84/12* (2013.01)

(56) References Cited

U.S. PATENT DOCUMENTS

| | | |
|---|---|---|
| 2008/0101280 A1 | 5/2008 | Gholmieh et al. |
| 2009/0257390 A1 | 10/2009 | Ji et al. |
| 2009/0305716 A1 | 12/2009 | Ono |
| 2010/0009634 A1 | 1/2010 | Budianu et al. |
| 2010/0246705 A1 | 9/2010 | Shin et al. |
| 2011/0003598 A1 | 1/2011 | Ma et al. |
| 2011/0045831 A1 | 2/2011 | Chiu et al. |
| 2011/0075651 A1 | 3/2011 | Jia et al. |
| 2011/0141941 A1 | 6/2011 | Lee et al. |
| 2011/0170496 A1 | 7/2011 | Fong et al. |
| 2011/0235582 A1 | 9/2011 | Chen et al. |
| 2012/0106472 A1 | 5/2012 | Rosa et al. |
| 2012/0113939 A1 | 5/2012 | Kim et al. |
| 2012/0178482 A1 | 7/2012 | Seo et al. |
| 2012/0195226 A1 | 8/2012 | Liu |
| 2012/0275390 A1 | 11/2012 | Korhonen et al. |
| 2012/0282964 A1 | 11/2012 | Xiao et al. |
| 2013/0176988 A1 | 2/2013 | Wang et al. |
| 2013/0114562 A1 | 5/2013 | Seo et al. |
| 2013/0272206 A1 | 10/2013 | Li et al. |
| 2013/0315092 A1 | 11/2013 | Yu |
| 2014/0036870 A1 | 2/2014 | Skov et al. |
| 2014/0050154 A1 | 2/2014 | Gunnarsson |
| 2014/0050181 A1 | 2/2014 | Tiirola et al. |
| 2014/0086203 A1 | 3/2014 | Furuskar et al. |
| 2014/0169322 A1 | 6/2014 | Ouchi et al. |
| 2014/0177602 A1 | 6/2014 | Chen et al. |
| 2014/0314014 A1 | 10/2014 | Zhang et al. |

FOREIGN PATENT DOCUMENTS

| | | |
|---|---|---|
| WO | 09/120934 | 10/2009 |
| WO | 11/100673 | 8/2011 |
| WO | 13/103545 | 7/2013 |

OTHER PUBLICATIONS

Alcatel-Lucent, "Introduction of MTC Overload Support," 3GPP TSG-RAN WG3 Meeting #71, R3-110938, Taipei, Taiwan (Feb. 21-25, 2011).

Brunel et al., "Inter-Cell Interference Coordination and Synchronization based on Location Information," 7th Workshop on Positioning Navigation and Communication, pp. 224-232 (Mar. 2010).

Di Fazio et al., "The Bandwidth Crunch: Can Wireless Technology Meet the Skyrocketing Demand for Mobile Data?," IEEE Long Island Systems, Applications and Technology Conference (LISAT), pp. 1-6 (May 2011).

Ericsson et al., "Introduction of X2 signalling support for eICIC," 3GPP TSG-RAN3 Meeting #71, R3-110498, Taipei, Taiwan (Feb. 21-25, 2011).

Henao et al., "Advanced receiver signal processing techniques: evaluation and characterization," Advanced Radio InTerface Technologies for 4G SysTems ARTIST4G, D2.2 (Jan. 21, 2011).

Huawei et al., "Discussion on the operation and performance of CoMP in scenarios 3 and 4," 3GPP TSG RAN WG1 Meeting #65, R1-111250, Barcelona, Spain (May 9-13, 2011).

Interdigital, "Fuzzy Cells: Improving Cell-Edge Performance in Multi-Carrier Cellular Systems," White Paper, pp. 1-12 (see, in particular, Fuzzy Cells—Enhancing User Experience at Cell-Edge, pp. 4-5) (Aug. 4, 2010).

LG Electronics, "Uplink Power Control for CoMP," 3GPP TSG RAN WG1 Meeting #68, R1-120444, Dresden, Germany (Feb. 6-10, 2012).

RAN 1, "[Draft] Reply LS on definition of ABS," 3GPP TSG-RAN WG1 #65, R1-111671, Barcelona, Spain (May 9-May 13, 2011).

Third Generation Partnership Project, "Technical Specification Group Radio Access Network; Evolved Universal Terrestrial Radio Access (E-UTRA); Further advancements for E-UTRA physical layer aspects (Release 9)," 3GPP TR 36.814 V9.0.0 (Mar. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.3.0 (Mar. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).

Third Generation Partnership Project, "Technical Specification Group Radio Access Network; Evolved Universal Terrestrial Radio Access

(56) References Cited

OTHER PUBLICATIONS (E-UTRA); Radio Resource Control (RRC); Protocol specification (Release 8)," 3GPP TS 36.331 V8.13.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.1.0 (Mar. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).

Third Generation Partnership Project, "Technical Specification Group Radio Access Network; Evolved Universal Terrestrial Radio Access (E-UTRA); Physical layer procedures (Release 10)," 3GPP TS 36.213 V10.1.0 (Mar. 2011).

Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.1.0 (Mar. 2011).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).

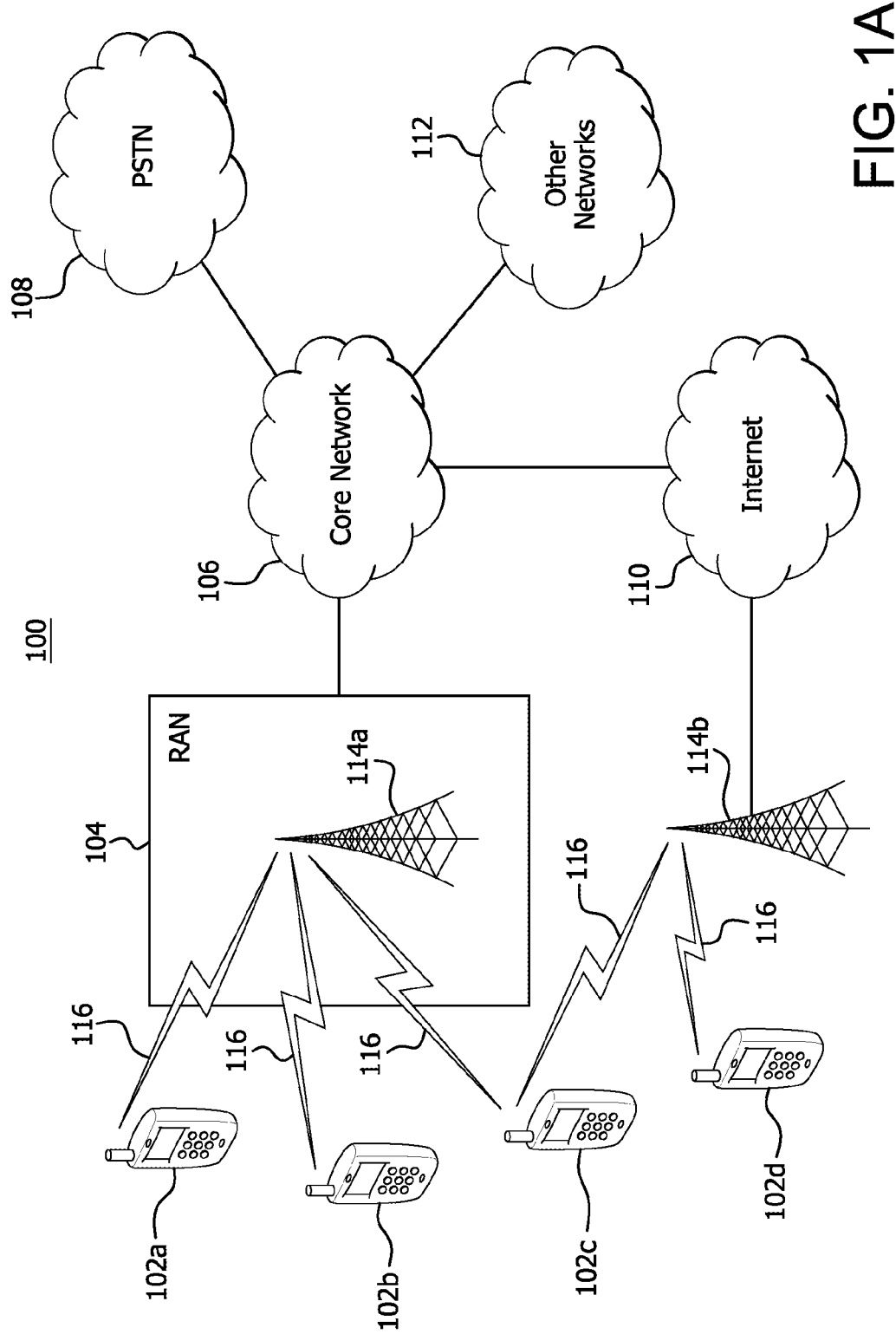

METHOD AND APPARATUS FOR DATA-SPLITTING TRANSMISSION FROM MULTIPLE SITES

CROSS REFERENCE TO RELATED APPLICATION

This application is a continuation of U.S. patent application Ser. No. 16/843,378 filed Apr. 8, 2022, which issued as U.S. Pat. No. 11,337,160 on May 17, 2022, which is a continuation of U.S. patent application Ser. No. 15/148,677, filed May 6, 2016, which is a continuation of U.S. patent application Ser. No. 14/118,225, filed Mar. 21, 2014, which is a 371 National Phase of International Patent Application PCT/US2012/038424, filed May 17, 2012, which claims the benefit of U.S. Provisional Application No. 61/589,764, filed Jan. 23, 2012, and U.S. Provisional Application No. 61/487,139, filed May 17, 2011. The contents of the above-identified applications are hereby incorporated by reference.

BACKGROUND

A 3GPP downlink (DL) transmission scheme may be based on an orthogonal frequency division multiple access (OFDMA) air interface. For the uplink (UL) direction, single-carrier (SC) transmission based on Discrete Fourier Transform (DFT)-spread OFDMA (DFT-S-OFDMA) may be used. In the DL direction, a wireless transmit/receive unit (WTRU) may be allocated by the eNodeB to receive its data anywhere across the entire transmission bandwidth. For example, an OFDMA scheme may be used. While a WTRU may receive its signal anywhere across the frequency domain in the entire transmission bandwidth, a WTRU in the UL direction may transmit on a limited, yet contiguous set of assigned sub-carriers in an FDMA arrangement. This principle is referred to as Single Carrier (SC) FDMA.

To improve inter-cell interference of Long Term Evolution (LTE)-based radio access systems, the concept of Almost Blank Subframe (ABS) is introduced. ABSs may include subframes with reduced transmit power (including no transmission) on some physical channels and/or reduced activity on those channels. The term ABS may describe no data transmission support. Other methods may be used in combination with ABS to improve throughput and coverage of radio access systems. Accordingly, patterns and measurement resource restrictions, taking into account both ABS and other methods, need to be scheduled and communicated between WTRUs and at least one eNB.

SUMMARY

Methods and apparatus for changing cell range coverage are disclosed. The cell range coverage may be changed on a per-subframe basis. An antenna beam elevation tilting angle may be adjusted to provide different effective downlink (DL) coverage. For example, a subframe may be a "small tilt subframe" or a "large tilt subframe." A network or evolved NodeB (eNB) may determine data channel transmission power to adjust cell range per subframe. Low Power Subframe (LPS) may be used to transmit data in the reduced cell range. Timing Advance (TA) handling for uplink (UL) transmissions is described. A common TA (CTA) may be determined for multi-site UL signaling. UL power control may be determined for UL transmission to multiple sites. Radio Link Monitoring (RLM) may be performed for multiple sites on a carrier frequency. A wireless transmit/receive unit (WTRU) may maintain synchronization in selected subframes for multiple cells.

BRIEF DESCRIPTION OF THE DRAWINGS

A more detailed understanding may be had from the following description, given by way of example in conjunction with the accompanying drawings wherein:

FIG. 1A is a system diagram of an example communications system in which one or more disclosed embodiments may be implemented;

DETAILED DESCRIPTION

Figure 1B:
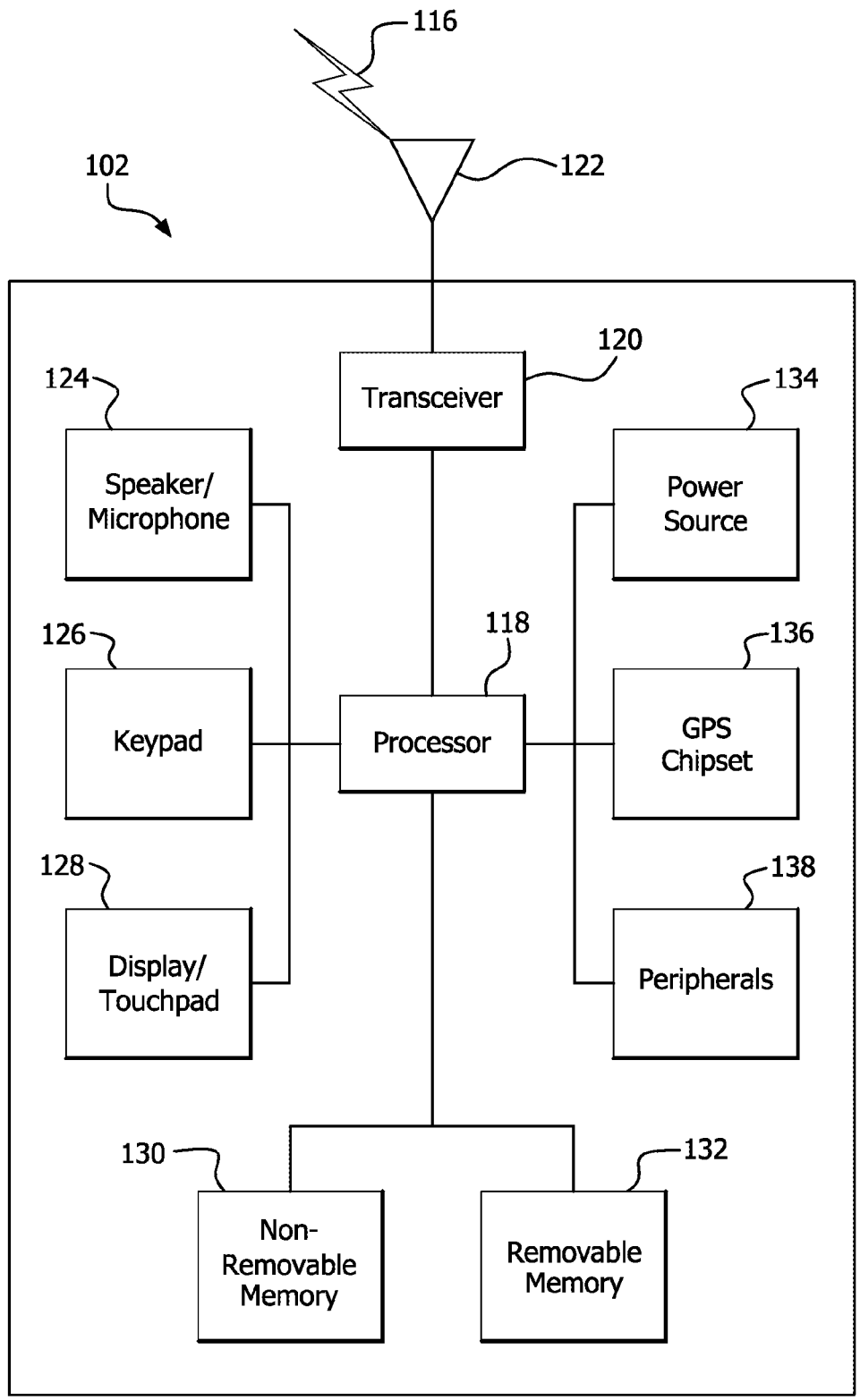
FIG. 1B is a system diagram of an example wireless transmit/receive unit (WTRU) that may be used within the communications system illustrated in FIG. 1A.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
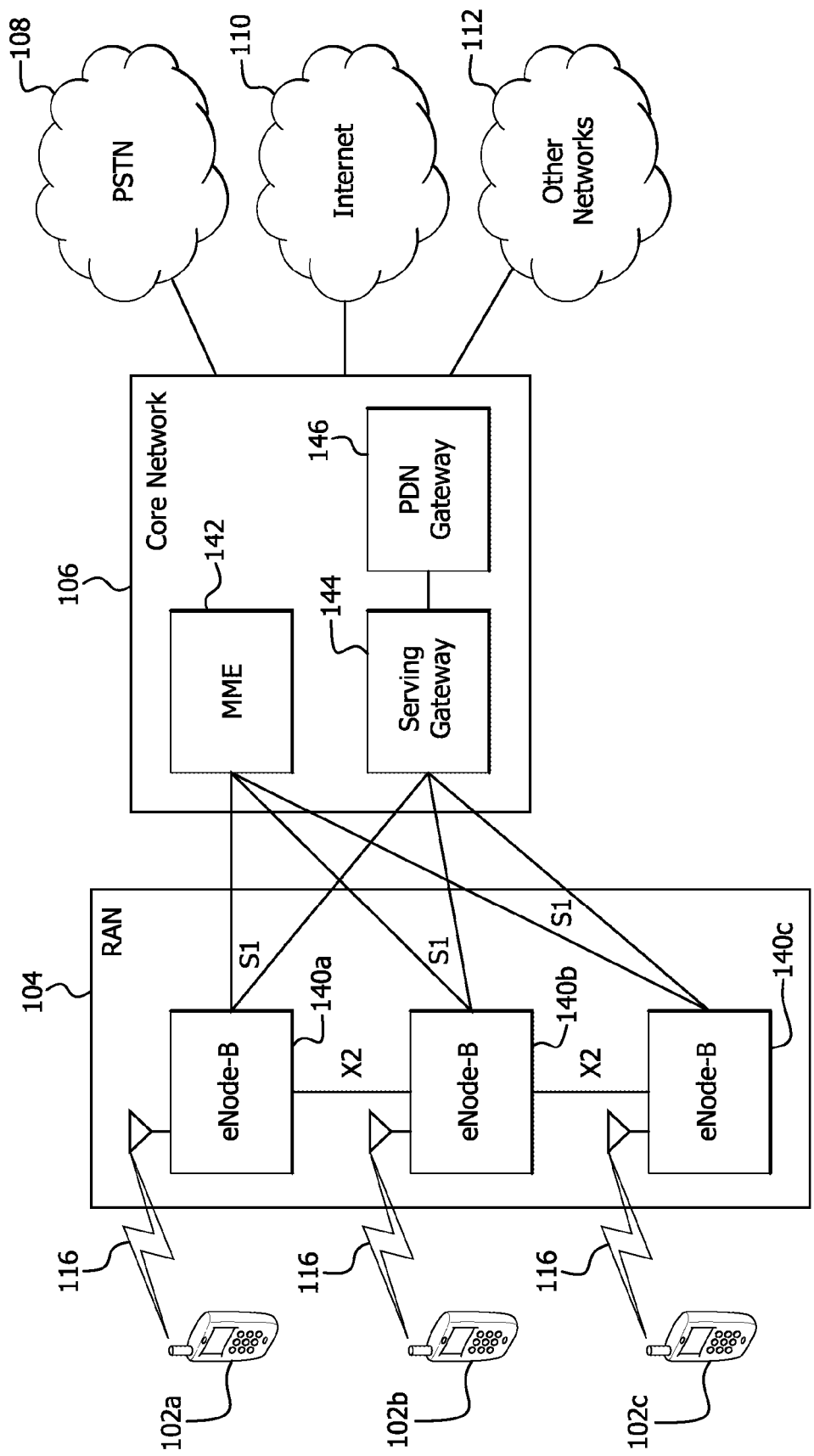
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Although particular technologies and methods are used to describe the examples provided herein, one skilled in the art will recognize that the examples are applicable to any technology. For example, although certain examples are described with respect to a Third Generation Partnership Program (3GPP) Long Term Evolution (LTE) system, one skilled in the art will recognize that the examples apply to any radio access technology.

The use of fuzzy cells (for example, data flow splitting) in the time domain (TD) is described. TD-Fuzzy cells may be implemented on any number of component carriers (CCs), including, for example, single carrier systems. As an example, a DL subframe transmission pattern may alternate between full power subframe and Low Power Subframe (LPS) in a repeating manner. For example, a first eNB may transmit LPS on even subframes while a second eNB may transmit LPS on odd subframes. This may enable two neighboring eNBs to multiplex overlapping cell coverage using a single carrier in the time domain.

Multi-site and/or multi-flow data on a single carrier frequency may be enabled via time domain multiplexing (for example, on a sub-frame basis) between multiple sites. For example, cell range (downlink (DL) coverage) may change on a per subframe basis. A network may determine an antenna beam elevation tilting angle to create different effective DL coverage per subframe. For example, the angle of the antenna pattern may be tilted such that a particular subframe may be a small tilt subframe (STS) or large tilt subframe (LTS). An alternating STS and LTS pattern may create overlapping cell coverage between two neighboring eNBs using a single carrier in time. A network may determine a data channel transmission power to create different cell range per subframe. As an example, the data channel may be a Physical Downlink Shared Channel (PDSCH). The network may transmit Lower Power Subframe (LPS) to provide user data to a WTRU near a cell center and full power subframe to provide user data to a WTRU at a cell edge. The cell edge WTRU may receive a higher data rate if neighboring cells are transmitting using LPS or Almost Blank Subframe (ABS) in the same subframe as full power transmission from a serving cell. This may result in lower inter-cell interference.

Timing Advance (TA) handling for uplink (UL) transmissions to multiple sites may be used. A WTRU may maintain and/or switch between TA for uplink (UL) control information (UCI) targeted to different sites. A network may determine a common TA (CTA), for example, for the purpose of multi-site UL signaling and transport format selection by the network. UL Power Control (PC) may be used for UL transmissions to multiple sites. A WTRU may maintain multiple PC loops for UCI targeted to different sites. Radio link monitoring (RLM) of multiple sites on the same carrier frequency may be used. A WTRU may track in- and out-of-synchronization in selective subframes for multiple cells.

A 3GPP system (for example, LTE), may support higher data rate and spectrum efficiency. The DL transmission scheme may be based on an orthogonal frequency domain multiple access (OFDMA) air interface. For the UL direction, single-carrier (SC) transmission based on Discrete Fourier Transform (DFT)-spread OFDMA (DFT-S-OFDMA) may be used. In the DL direction, a WTRU may be allocated by an eNode B to receive data anywhere across the entire LTE transmission bandwidth. For example, an OFDMA scheme may be used. The DL directly may have an unused direct current (DC) offset sub-carrier in the center of the spectrum. In the UL direction, transmissions may be based on DTF-S-OFDMA, or equivalently, SC-FDMA transmission.

In the DL direction, a WTRU may receive its signal anywhere across the frequency domain in the entire (for example, LTE) transmission bandwidth. A WTRU in the UL directly may transmit on a limited, yet contiguous set of assigned sub-carriers in an FDMA arrangement. This may be referred to as Single Carrier (SC) FDMA. As an example, if the overall OFDM signal or system bandwidth in the UL direction comprises useful sub-carriers numbered 1 to 100, a first WTRU may be assigned to transmit its own signal on, for example, sub-carriers 1-12, a second WTRU may transmit on, for example, sub-carriers 13-24, and other WTRUs may transmit based on a similar scheme. An eNodeB may receive the composite UL signal across the entire transmission bandwidth from, for example, one WTRU (or more generally, several WTRUs) at the same time. Each WTRU may transmit using a subset of the available transmission bandwidth. DFT-S OFDM in the LTE UL may therefore be seen as a form of OFDM transmission with the additional feature that the time-frequency resource assigned to a WTRU may include a set of frequency-consecutive sub-carriers. In the LTE UL, there may be no DC sub-carrier. Frequency hopping may be applied in one mode of operation for UL transmissions by a WTRU.

Enhanced Inter-Cell Interference Cancellation is one method of improving achievable throughput and coverage of LTE-based radio access systems. Enhanced Inter-Cell Interference Coordination (eICIC) may support an ABS feature. ABSs may include subframes with reduced transmit power (including no transmission) on some physical channels and/or reduced activity on those channels. The term ABS may describe no data transmission support. The term "Low Power Subframe" (LPS) may be used to describe subframes with a power adjustment that supports data transmission. The eNB may ensure backwards compatibility with WTRUs by transmitting control channels and physical signals as well as System Information, such as, for example, a Cell Reference Signal (CRS). A macro cell transmitting LPS or ABS may provide cell range extension for small cells, such as a picocell or CSG cell, in a hetnet scenario, wherein a WTRU assigned to a picocell may be experiencing low Signal to Interference-Plus-Noise Ratio (SINR) due to proximity to a macro cell. The WTRU may have improved SINR in the subframes in which the macro cell uses LPS/ABS subframes. Patterns based on LPS/ABS subframes may be signaled to the WTRU to restrict the WTRU measurements to, for example, specific subframes, which may be referred to as measurement resource restrictions.

For example, three types of measurement resource restriction patterns may be configured for a WTRU. For example, a single Radio Resource Management (RRM)/RLM measurement resource restriction may exist for the serving cell. As another example, at least one RRM measurement resource restriction may exist for neighbor cells. This may apply to particular neighbor cells and/or inter-frequency cells. As another example, resource restriction for channel state information (CSI) measurement of the serving cell may be applied. Any number of subframe subsets may be configured per WTRU. For example, two subframe subsets may be configured per WTRU. The WTRU may report CSI for each configured subframe subset. For periodic CSI reports, each CSI report may be linked to, for example, a configured subset of subframes.

A WTRU may estimate the inter-cell interference from signal power measurement on CRS of an aggressor eNB in the ABS or LPS subframe and may cancel the aggressor eNB CRS signal power from the received signal. This may allow a more effective SINR, which may effectively extend the coverage of the serving cell if the ABS or LPS subframe is used in the interfering cell. In RRC_CONNECTED state, the RRM/RLM/CSI measurement resource restrictions may be configured by dedicated RRC signaling.

Figure 2:
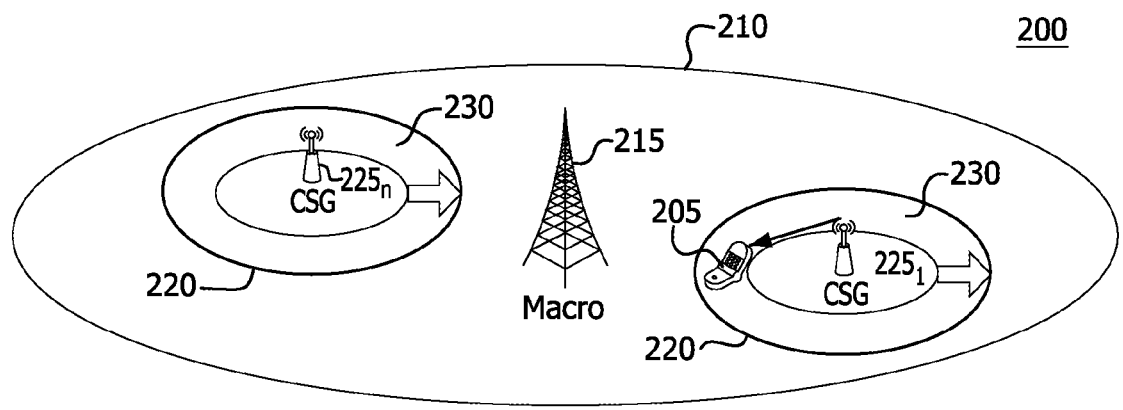
FIG. 2 shows an example of power coverage using Almost Blank Subframe (ABS) transmission or Low Power Subframe (LPS)

FIG. 2 shows an example 200 of power coverage using ABS or LPS. A WTRU 205 may be within the coverage area 210 of a macro cell 215 and/or within an extended coverage area 220 corresponding to one or more picocells or Closed Subscriber Group (CSG) cells $225_1 \ldots _n$. If the WTRU 205 in the extended coverage area 230 (as shown by the arrow) wants to communicate with one of the CSG cells $225_1$, the WTRU 205 may cancel inter-cell interference from the macro cell 215 as described above. The WTRU 205 may estimate the macro cell transmit power to be subtracted from total received signal power by measuring the CRS from the macro cell 215 during an ABS subframe transmission from the CSG cell $225_1$. The WTRU 205 may obtain a higher SINR from the CSG cell $225_1$ by cancelling the inter-cell-interference from the macro cell 215 to allow for enhanced communication in the extended coverage area 230 with the CSG cell $225_1$.

Figure 3:
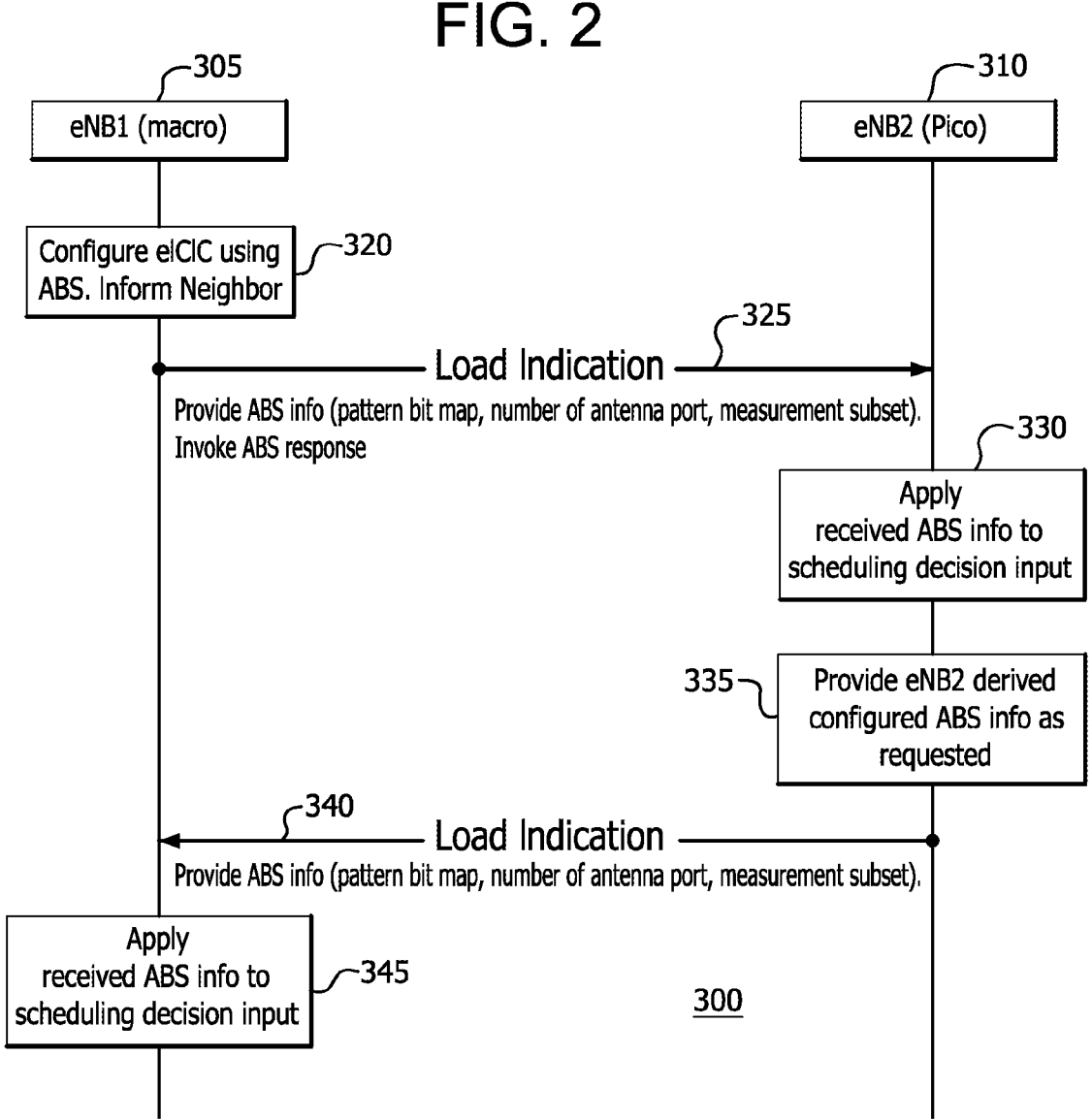
FIG. 3 shows an example of ABS configuration coordination between evolved NodeBs (eNBs)

FIG. 3 shows an example 300 of ABS configuration coordination between eNBs. eNB1 305 may be in communication with eNB2 310. For example, eNB1 305 may be a macro cell. Also, for example, eNB2 310 may be a picocell (or a CSG cell). The operation of ABS may be coordinated by eNB1 305 and/or eNB2 310. For example, eNB1 305 and eNB2 310 may transmit one or more X2AP message Load Indications. eNB1 305 or eNB2 310 may synchronize ABS and LPS frame scheduling with each other. Based on the scheduling information, a WTRU (not shown) may be configured by the network (not shown) to perform radio link monitoring (RLM) if eNB1 305 or eNB2 310 schedules ABS/LPS.

Still referring to FIG. 3, eNB1 305 and eNB2 310 may coordinate using one or more (or any combination of) the following messages or features. eNB1 305 may configure eICIC using ABS 320. eNB1 305 may attempt to inform any neighbor eNB of the configuration, for example, eNB2 310. eNB1 305 may transmit a load indication 325 to eNB2 310. The load indication 325 may, for example, provide ABS or LPS information. For example, the ABS information may include a pattern bitmap, a number of an antenna port, a measurement subset, and/or the like. The load indication 325 may request or invoke an ABS response. eNB2 310 may apply the received ABS information. For example, eNB2 310 may apply the received ABS information for a scheduling decision 330. eNB2 310 may derive the ABS scheduling pattern to be used from the eNB1 305-provided ABS info. The derived eNB2 310 configured ABS information 335 may be provided to eNB1 305 in a load indication 340. The load indication 340 may, for example, provide ABS information. For example, the ABS information may include a pattern bitmap, a number of an antenna port, a measurement subset, and/or the like. eNB1 305 may apply the received ABS information for a scheduling decision 345. The ABS information may be used to support LPS configuration.

A fuzzy cell may be used to allow multiple flows from multiple sites (multi-site) to maximize transmission signal quality and/or data throughput. Data flow may be split into sub-flows for transmissions using multiple sites.

Figure 4:
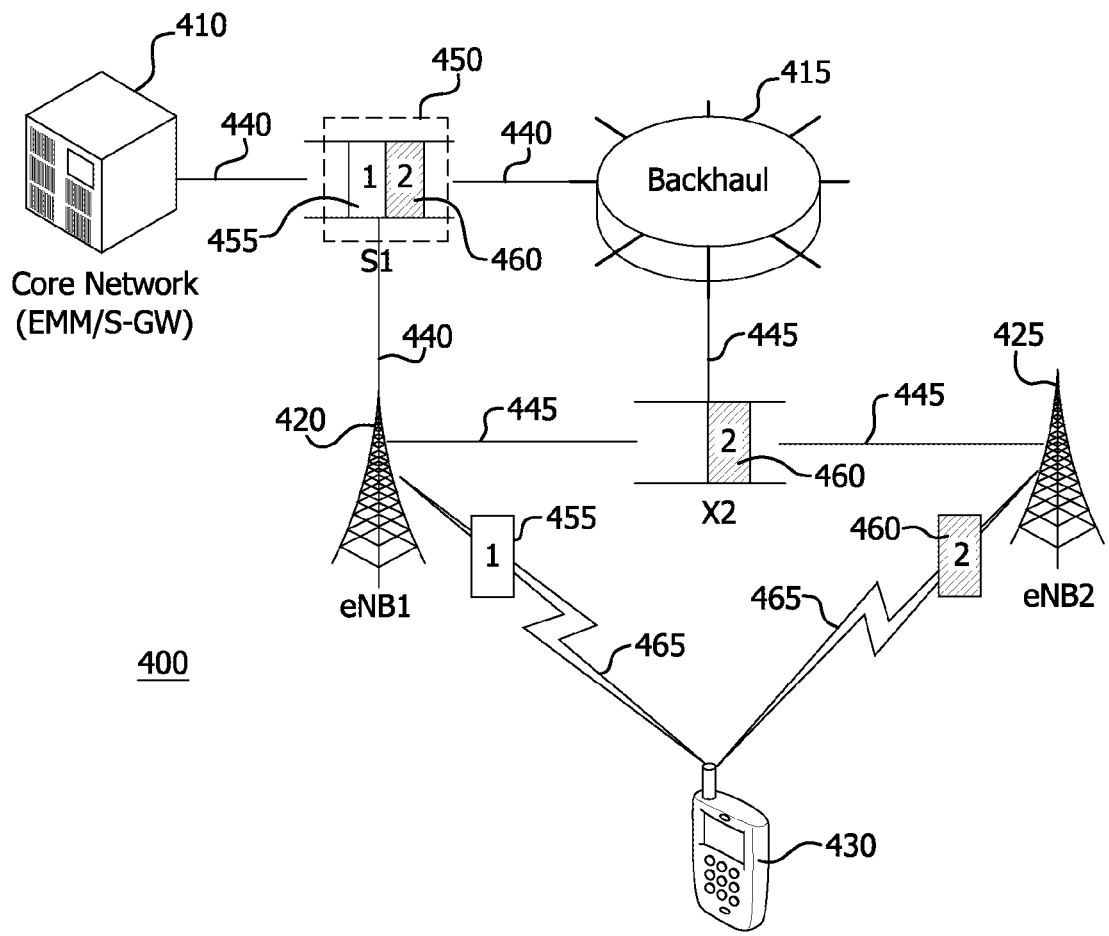
FIG. 4 shows an example of downlink data flow splitting using fuzzy cell deployment.

FIG. 4 shows an example 400 of downlink data flow splitting using fuzzy cell deployment. FIG. 4 shows a core network 410, a backhaul 415, a first eNB (eNB1) 420, a second eNB (eNB2) 425, and a WTRU 430. The core network (CN) 410, eNB1 420, and/or eNB2 425 may communicate via an S1 interface 440 using the service provided by the backhaul 415. eNB1 420 and/or eNB2 425 may communicate via an X2 interface 445 using the service provided by the backhaul 415. A data payload 450 is shown split into two parts: a first payload (payload1) 455 and a second payload (payload2) 460. eNB1 420 and/or eNB2 425 may communicate with the WTRU 430 via one or more air interfaces 465.

A flow split may occur at an eNB, such as eNB1 420 or eNB2 425. An application data packet (including data payload 450) may be downloaded from the CN 410 to a serving eNB, which may be eNB1 420 in this example, via the S1 interface 440. eNB1 420 may decide how to split the data payload 450 that was received from the CN 410 and intended for the WTRU 430. The data payload 450 may be split in two parts, shown as payload1 455 and payload2 460. Payload1 455 may be sent to the WTRU 430 directly from eNB1 420. Payload2 460 may be forwarded to a cooperating eNB, which may be eNB2 425 in this example, via the X2 interface 445. The splitting and the forwarding may be performed as a single decision or may be separate decisions at separate times. eNB2 425 may transmit payload2 460 to the WTRU 430. In the case of N cooperating eNBs, the data payload 450 may be split into N parts by the serving eNB (eNB1 420 in this example) and may be delivered via the X2 interface 445 to appropriate cooperating eNBs (eNB2 425 and/or any other eNBs not shown) for transmission to the WTRU 430 (or any other WTRUs not shown).

Additional signaling over the backhaul 415 may be used to support efficient splitting of the data flow. For example, eNB2 425 may provide estimates of the supported data rate that it may provide to the WTRU 430 that it may be shared with eNB1 420. These estimates may allow eNB1 420 to make an initial decision regarding how much data to send to eNB2 425 for the WTRU 430 upon or after application packet arrival at eNB1 420. eNB2 425 may continue to inform eNB1 420 regarding estimated supported data rates. eNB2 425 may alternatively or additionally transmit buffer status reports to eNB1 420, thereby providing eNB1 420 with accurate information regarding the actual delivery rate of the forwarded data. Based on the updated information, eNB1 420 may decide whether or not to transmit additional data to eNB2 425. For example, a goal may be maintaining the correct balance between the data flows.

To support uplink signaling in an inter-site multicarrier (for example, a Coordinated Multi-Point (CoMP) Transmission or fuzzy cell) system, the following Physical Uplink Control Channel (PUCCH) and Physical Uplink Shared Channel (PUSCH) transmission methods may be used. For example, a single PUCCH may be received by a first eNB, and a single PUSCH may be transmitted on the first eNB. The eNB may be a primary. Alternatively or additionally, a single PUCCH may be received by both a first and a second eNB, and single PUSCH may be transmitted on one of the eNBs or cells. For example, the first eNB may be a primary cell (Pcell) and the second eNB may be a serving cell (Scell). A Pcell may reside on a primary eNB and a Scell may reside on either a primary or secondary eNB. Alternatively or additionally, a separate PUCCH may be used for each eNB or cell (for example, carried in different frequencies for multi-carrier deployment or staggered in time domain for single or multi carrier deployment), and a separate PUSCH may be used for each eNB or cell.

Radio Link Failure (RLF) detection procedures may, in some examples, consider a single DL carrier. Radio link quality may be measured as a block Physical Downlink Control Channel (PDCCH) error rate considering Physical Control Format Indicator Channel (PCFICH) errors with an assumed transmission configuration. The WTRU may monitors DL radio quality against quality thresholds (for example, Qin and Qout) every frame or during discontinuous reception (DRX) Active Time if DRX configuration is applied. The physical layer may provide in-sync and out-sync indications to the RRC entity if the quality thresholds are exceeded. Upon reception of N310 consecutive out-sync indications, the RRC may detect a radio link problem and may start a recovery timer T310. If T310 expires before N311 consecutive in-sync indications are received, RLF may be declared and a RRC Connection Reestablishment procedure may be applied. While the recovery timer T310 is running, radio link quality may be monitored continuously regardless of DRX state.

For a Time Domain Fuzzy Cell, data-splitting may be used in the case of single carrier frequency with multiple cells. In LTE, the radio link to a site may be defined by a single cell per-carrier frequency. In the case of carrier aggregation (CA), multiple component carriers may be aggregated with, for example, at most 1 CC per CC frequency. To enable multi-flow access in a single carrier frequency, aggregation may be extended to multiple cells on the same carrier frequency.

Figure 5:
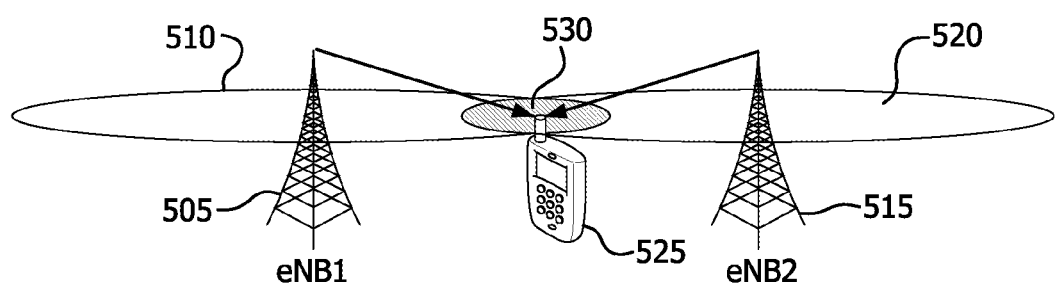
FIG. 5 shows an example macro cell deployment.

FIG. 5 shows an example 500 macro cell deployment. A first eNB (eNB1) 505 has a corresponding coverage area 510. A second eNB (eNB2) 515 has a corresponding coverage area 520. eNB1 505 and eNB2 515 may be capable of providing coverage or service to a WTRU 525. The WTRU 525 is shown in a location within the coverage area 510 of eNB1 505 and the coverage area 520 of eNB2 515. Thus, the WTRU 525 is located in an overlapping coverage area 530 between eNB1 505 and eNB2 515.

The use of ABS may be applied to the HetNet in LTE. ABS may be extended to LPS and applied to macro base station in a same or close geographic region. Coordination of a transmission pattern among neighboring cells is described and configuration and transmission of the pattern to one or more WTRUs if antenna beam tilting is applied to create multiple cells on a single carrier is also described. Simultaneous UL transmission to multiple sites with different TA by a WTRU and the corresponding UL transport format selection process by the network is described. Monitoring and adjustment of transmission time for subsequent subframe transmission to multi-site with different timing adjustment is described. Monitoring of radio link failure for multi-cell on a single carrier frequency supporting multi-site transmission is described.

In some 3GPP systems, ABS may be the term applied to subframes in which signals for backward compatibility are required and used to enable cell range extension in HetNet deployments. eICIC messages may be extended to signal and allow negotiation of the power levels for each subframe in the subframe pattern. The ABS concept may be extended with power adjustment for data transmission and may be referred to as LPS herein. LPS may be considered in homogeneous cell deployment (for example, macro deployments). A pattern length the same or similar to that used for ABS may be used for backward compatibility, but other lengths may also be used for LPS. LPS may create smaller coverage zone than normal subframes and may causes less interference to neighbor cells' DL data transmission. By mixing LPS and normal (for example, full power) subframes in the time domain, it may be possible to prevent a WTRU from, or minimize its chance of, staying in a cell edge condition, and for example, experiencing low SINR.

A network may increase regional system capacity by coordinating the LPS and/or antenna tilting pattern among neighbor coverage/cell to obtain maximum inter-cell-interference reduction advantage in the coverage region. The effect of LPS may be achieved by varying down-tilt angle of a transmit antenna pattern for a configurable duration or periodicity. For example, the tilt angle may be switched on a per-subframe scale. Increasing the antenna pattern down-tilt angle may effectively reduce the coverage area and interference to neighbor cells. Two types of subframes are described herein. Each subframe may be transmitted with a different antenna tilt. A subframe transmitted with small antenna pattern tilting angle may be referred to as a small tilt subframe (STS) and a subframe transmitted with a large antenna pattern tilting angle may be referred to as a large tilt subframe (LTS). LPS and STS/LTS may be used together to create multiple levels of cell coverage, which may allow for additional network optimization.

Figure 6:
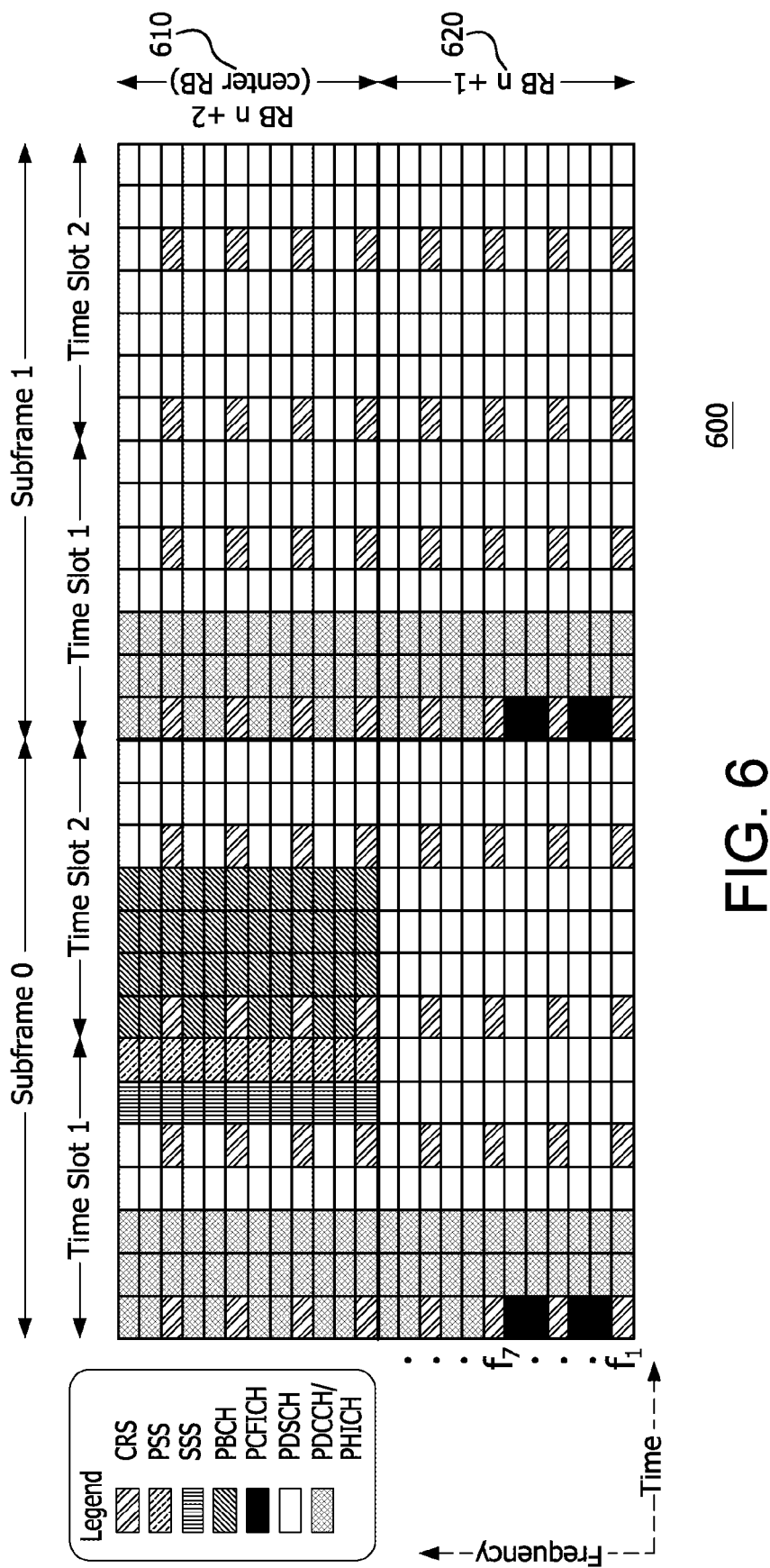
FIG. 6 shows an example physical channel mapping to the resource element (RE) on a portion of the downlink (DL) bandwidth (BW)

FIG. 6 shows an example 600 physical channel mapping to the resource element (RE) on a portion of LTE DL bandwidth (BW). A center resource block (RB) 610 is shown next to a non-center RB 620. For the ABS, the PDCCH/Physical Hybrid ARQ Indicator Channel (PHICH) and PDSCH may not be transmitted. For the LPS, PDCCH/PHICH and PDSCH may be transmitted at a reduced power. An example difference between a LPS and an ABS (as shown in FIG. 6) is the transmit power of the PDCCH/PHICH. The remaining physical channels may be transmitted at a normal power level for both the LPS and ABS subframes. The CRS may be used by a WTRU to estimate the signal power from a specific cell. The primary synchronization signal (PSS) may provide the slot timing and the physical cell identity (local) in a cell identity group. The secondary synchronization signal (SSS) may provide the cell identity group, duplex mode identification (TDD or FDD), and/or radio frame timing. The Physical Broadcast Channel (PBCH) may provide the system information (for example, MIB, SIBx (1, 2, etc.). The Physical Control Format Indicator Channel (PCFICH) may indicate how many OFDM symbols in the first time slot of a subframe may be used for a control channel (for example, PDCCH). The PDSCH may be the channel that carries the data payload for multiple users and may be the main target of power reduction in LPS. The PDCCH may be used by the eNB (or network) to schedule UL/DL radio resources for WTRUs. The PHICH may be the channel that signals the UL data transmission ACK/NACK feedback to a WTRU.

Figure 7:
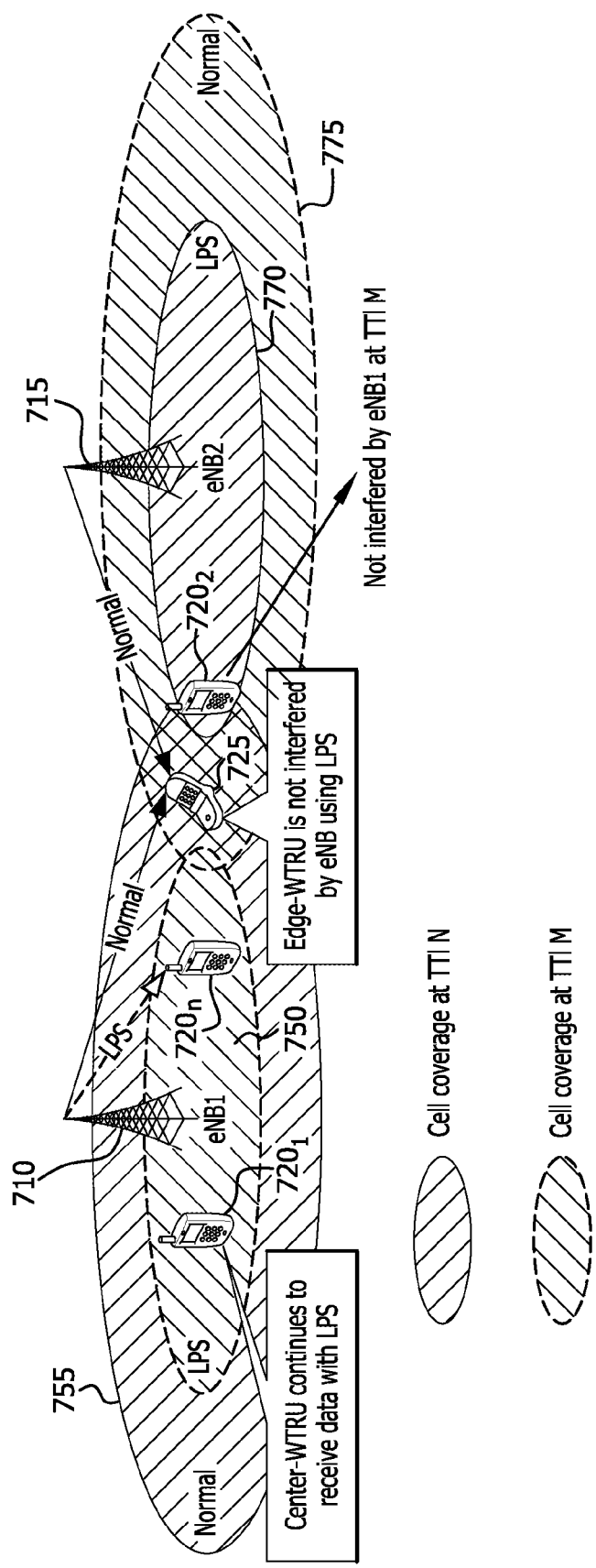
FIG. 7 shows an example of reduced inter-cell interference using LPS.

LPS may allow a WTRU near the cell center (center-WTRU) to have continuous access to RB resources for data transmission and/or a WTRU near the cell edge (edge-WTRU) receiving DL data transmission from neighbor cell to benefit from reduced inter-cell interference at the same time. FIG. 7 shows an example 700 of reduced inter-cell interference using LPS. A first eNB (eNB1) 710 and a second eNB (eNB2) 715 may communicate with a plurality of WTRUs 720₁ . . . ₙ 725. The WTRUs may include center-WTRUs 720₁ . . . ₙ and an edge-WTRU 725. Cell coverage at one transmission time interval (TTI) (TTI N) and coverage at another TTI (TTI M) is shown. In this example, the cell coverage 750 of eNB1 710 during TTI M may be according to an LPS subframe. The cell coverage 755 of eNB1 710 during TTI N may be according to normal subframe transmission. The cell coverage 775 of eNB2 715 during TTI M may be according to normal subframe transmission. The cell coverage 770 of eNB2 715 during TTI N may be according to an LPS subframe.

As shown in FIG. 7, the edge-WTRU 725 may receive according to normal subframe transmission from eNB2 715 during TTI M. During TTI M, eNB1 710 may transmit according to an LPS subframe, so the eNB1 710 transmissions may not interfere with the communication between eNB2 715 and the edge-WTRU 725. Similarly, center-WTRU 720₂ may not be interfered with by eNB1 710 during TTI M. During TTI M, center-WTRU 720₁ as well as other WTRUs (WTRU 720) may continue to receive data from eNB1 710 according to an LPS subframe.

Figure 8:
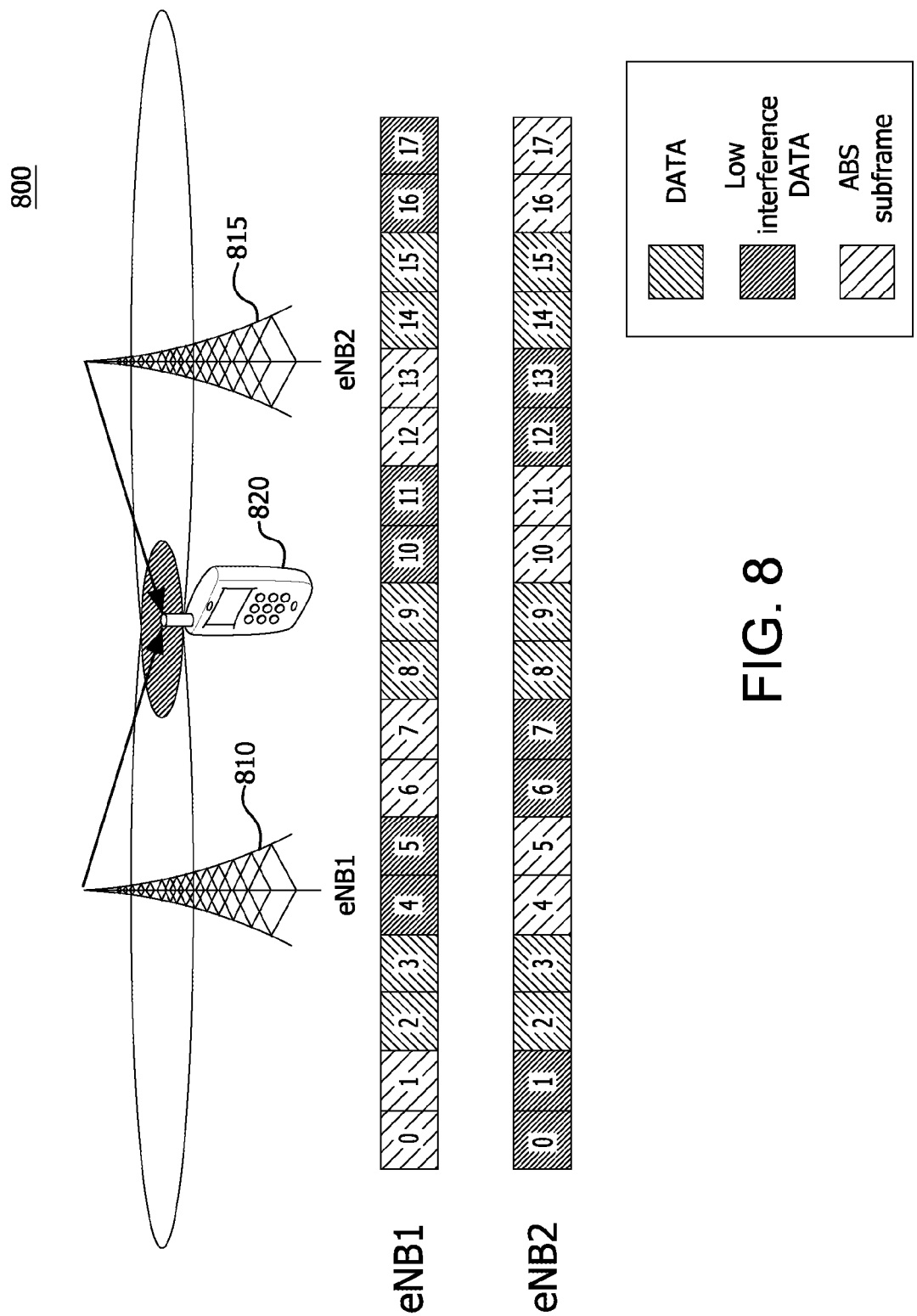
FIG. 8 shows an example of multi-site time domain multiplexing (TDM) using LPS.

FIG. 8 shows an example 800 of multi-site time domain multiplexing (TDM) using LPS. Thus, the fuzzy cell concept may be applied in the time domain by using LPS. FIG. 8 shows an example LPS configuration on a single carrier frequency between two eNBs, eNB1 810 and eNB2 815. Although, only two eNBs are shown for exemplary purposes, the example may be generalized and/or applied to three or more eNBs. Each of the eNBs (eNB1 810 and eNB2 815 in this example) may be in communication with a WTRU 820 (or more than one WTRU) that may be in the coverage area of both eNB1 810 and eNB2 815. In this example, the LPS may be scheduled with a pattern that repeats every 6 sub-frames. For example, LPS may be scheduled during subframes 0, 1, 6, 7, 12, 13, and so on for eNB1 810 and during subframes 4, 5, 10, 11, 16, 17, and so on for eNB2 815. During the LPS transmission, a limited number of control signals may be sent. For example, these control signals may include CRS, MIB/SIB, Synch Channel, Paging, and/or associated PDCCH. For example, no user data may be sent on a data channel (for example, PDSCH). Alternatively or additionally, the user data may be sent at reduced power, thus lowering interference generated in other cells.

Figure 9:
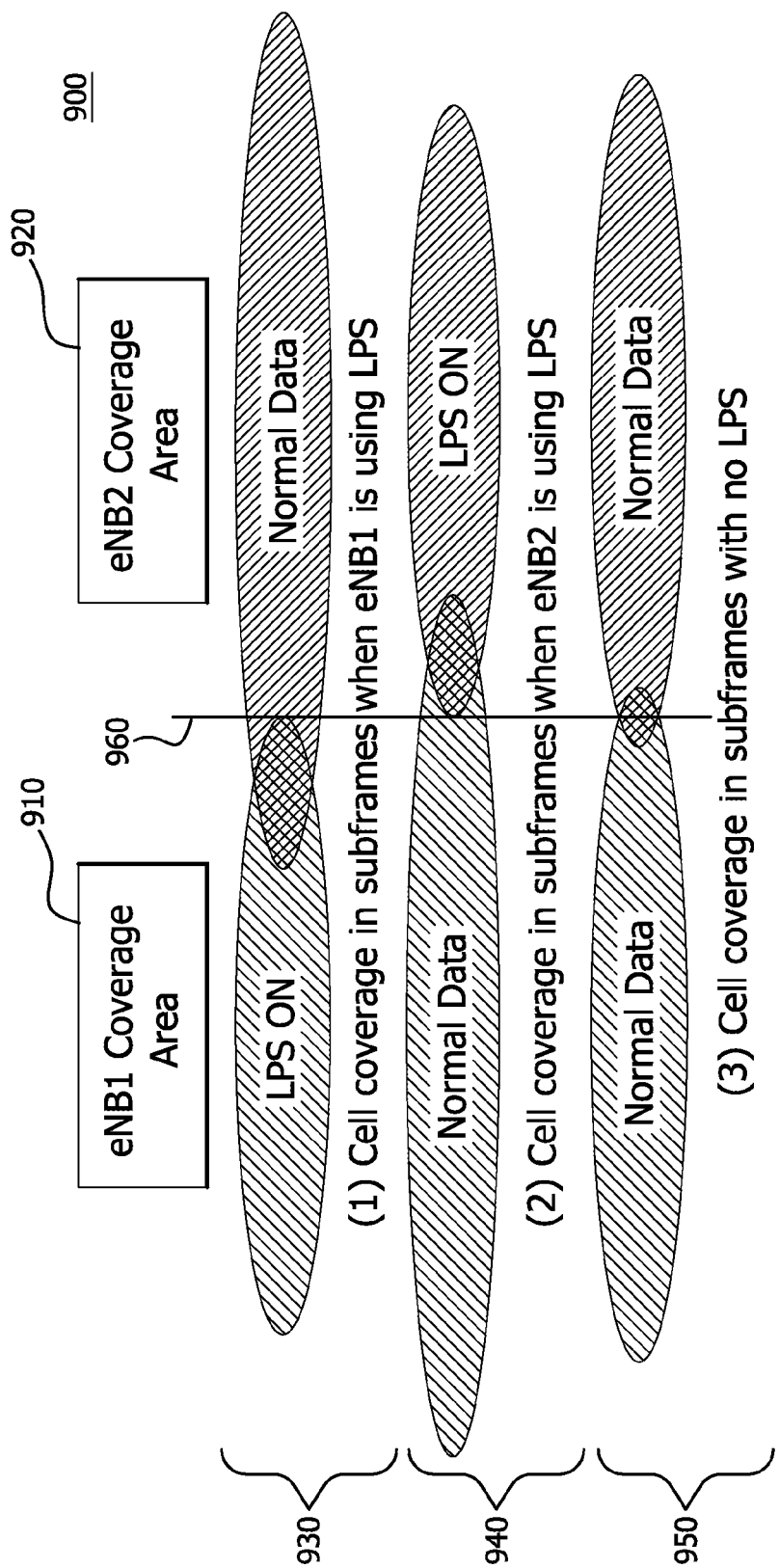
FIG. 9 shows another example of multi-site TDM using LPS.

FIG. 9 shows another example 900 of multi-site TDM using LPS. This example shows three exemplary types of multi-site subframes for WTRU reception. One type of subframe (referred to herein, for example, as a "Type 1 subframe 930") may be a subframe during which LPS may be applied for eNB1 910 and its associated coverage area, while normal data transmission may be applied for eNB2 920 and its associated coverage area. Another type of subframe (referred to herein, for example, as a "Type 2 subframe 940") may be a subframe during which LPS may be applied for eNB2 920 and its associated coverage area, while normal data transmission may be applied for eNB1 910 and its associated coverage area. Another type of subframe (referred to herein, for example, as a "Type 3 subframe 950") may be a subframe during which normal data transmission may be applied for eNB1 910 and its associated coverage area, and normal data transmission may be applied for eNB2 920 and its associated coverage area. Thus, for a Type 3 subframe 950, LPS may not be applied. The vertical line may indicate a cell-edge location 960 of the Type 3 subframe. The coverage areas may be identified by SINR coverage range.

As shown in FIG. 9, a Type 1 subframe 930 may allow the eNB2 920 coverage area to reach a WTRU in the eNB1 910 coverage area, but the eNB1 910 coverage area may not be able to reach a WTRU in the eNB2 920 coverage area during that subframe. Similarly, a Type 2 subframe 940 may allow the eNB1 910 coverage area to reach a WTRU in the eNB2 920 coverage area, but the eNB2 920 coverage area may not be able to reach a WTRU in the eNB1 910 coverage area during that subframe. A Type 3 subframe 950 may allow the eNB2 920 coverage area to reach a WTRU in the eNB1 910 coverage area, and may allow the eNB1 910 coverage area to reach a WTRU in the eNB2 920 coverage area during that subframe.

Accordingly, the use of LPS in one cell may reduce the interference power from that eNB. The use of LPS may therefore provide a higher SINR to cell-edge WTRUs compared to locations in which normal data transmission is used. The WTRU received SINR may be further increased using interference cancelation at the receiver to remove the interfering CRS. This method may provide a boost to achievable data throughput (TP) in Type 1 subframes 930 and Type 2 subframes 940. This may be particularly advantageous in the case that the LPS subframe includes no data transmissions (for example, the PDCCH).

The DL reception possibilities for a cell-edge-WTRU may depend on the subframe type. In subframes in which average WTRU receive data power from a site is larger than from other sites, for example, in a Type 1 subframe 930 or a Type 2 subframe 940, the following options may be used.

The WTRU may be scheduled from eNB2 920 for a Type 1 subframe 930 and from eNB1 910 for a Type 2 subframe 940. For power saving purposes, a WTRU that supports TDM fuzzy may optionally be provided with information (for example, LPS configuration) sufficient for the WTRU to determine that this is a subframe for which it may be scheduled from eNB1 910 or eNB2 920. The WTRU may attempt to receive data from only eNB1 910 or eNB2 920. Examples include (but are not limited to) the following methods. LPS patterns of nearby cells may be signaled to the WTRU. LPS patterns of nearby cells may be broadcast and detected and/or stored by the WTRU. An RX opportunity schedule may be sent to the WTRU via RRC signal. Optionally, an UL grant may be transmitted on a PDCCH in the LPS.

In subframes in which the highest average WTRU receive data power is close to the average WTRU receive data power from one or more other sites, for example, in a Type 3 subframe 950, the following options may be used. In one example, the WTRU may be preferentially scheduled only from one eNB (for example, eNB1 910 or eNB2 920). The WTRU may be configured to decode a PDCCH from the one eNB, optionally the one with higher signal quality. The following advantages may be realized using this option. The WTRU may only need to receive data from at most one site in any given subframe. A/N signaling may not need to be sent to more than one site in any given subframe.

Alternatively or additionally, the WTRU may be scheduled from both eNBs (for example, eNB1 910 and eNB2 920). The WTRU may decode both PDCCHs (associated with eNB1 910 and eNB2 920). Optionally, the eNBs may use different demodulation reference signal (DMRS) REs, such that they may not collide. This may be semi-statically agreed upon among eNBs. This may occur if there are simultaneous transmissions for the WTRU. Schedulers may be similarly independent as in a Type 1 subframe 930 or Type 2 subframe 940.

Alternatively or additionally, a WTRU near a cell edge may be scheduled from either, but not both eNBs (eNB1 910 or eNB2 920). The WTRU may decode both PDCCHs if no grant and/or allocation is found or received from eNB1 910. Schedulers may decide dynamically which eNB will use the subframe for this WTRU. This may occur on a real-time basis or partially not real-time. For example, based on current CSI feedback and/or other information, each eNB may bid (for example, over an X2 interface) to allocate data to the WTRU in a future Type 3 subframe 950. The higher bid may use the subframe. Confirmation of a winning bid may not be needed with proper bid design, so one-way X2 delay may be needed. An example bid may be the transport block (TB) size expected to transmit to the WTRU. This size may include a small cell-specific offset to prevent ties.

The WTRUs not located at the cell edge may continue to receive data in all subframe types from a single site if LPS is applied. These cell-center-WTRUs may either receive no data in the subframe in which a primary cell is using ABS or the WTRUs may receive data according to the methods described above for Type 1 subframes 930 or Type 2 subframes 940 if LPS is used.

As described above, a network may assign a subset of LPS patterns to one WTRU and the remainder to other WTRUs. This assignment may be signaled to a WTRU so that the WTRU may perform PDCCH decoding on assigned subframes (and optionally not on other subframes) to reduce CPU processing.

Figure 10A:
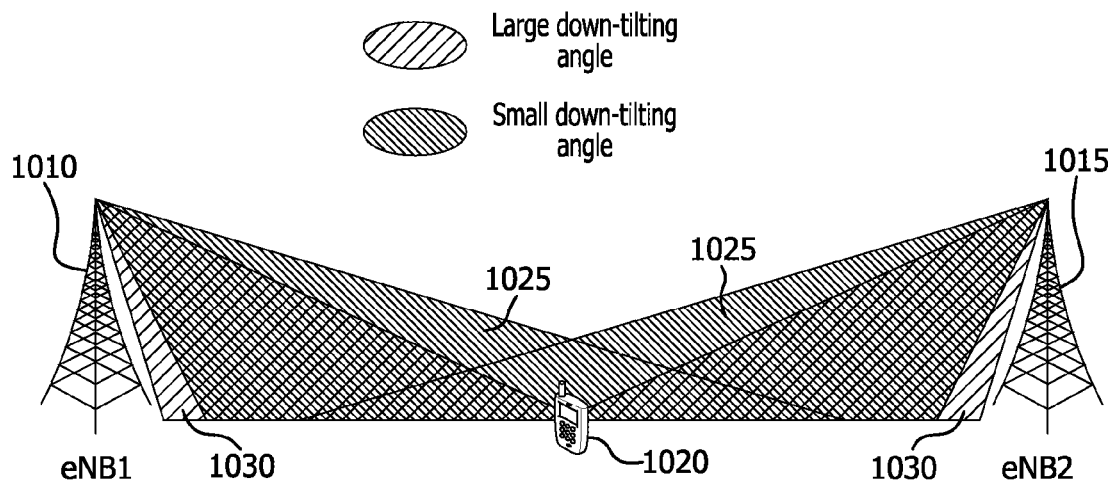
FIG. 10A shows an example of using antenna beam tilting to create cell coverage zones.

Coordinated antenna beam tilting may be used alone or in addition to any of the other features described herein. Multi-site association may also be used. FIG. 10A shows an example 1000 of using antenna beam tilting to create cell coverage zones. For example, different cell coverage zones may be created by changing the elevation (for example, antenna beam down-tiling angles) of network data transmission direction. FIG. 10A shows a first eNB (eNB1) 1010 and a second eNB (eNB2) 1015. Each of the eNBs (eNB1 1010 and eNB2 1015) may be in communication with a WTRU 1020 (or more than one WTRU) that may be in the coverage area of both eNB1 1010 and eNB2 1015. FIG. 10A shows small antenna beam down-tilting angles 1025 for eNB1 1010 and eNB2 1015. FIG. 10A also shows large antenna beam down-tilting angles 1030 for eNB1 1010 and eNB2 1015. FIG. 10A shows that the small antenna beam down-tilting angles 1025 may intersect with the large antenna beam down-tilting angles 1030 at particular locations or coverage areas. For example, a particular coverage area may be covered by a beam pattern based on both the small antenna beam down-tilting angles 1025 and the large antenna beam down-tilting angles 1030 from a particular eNB (for example, eNB1 1010 or eNB2 1015). Similarly, a particular coverage area may be covered by a beam pattern based on the small antenna beam down-tilting angles 1025 or the large antenna beam down-tilting angles 1030 from one eNB (for example, eNB1 1010) and the small antenna beam down-tilting angles 1025 or the large antenna beam down-tilting angles 1030 from another eNB (for example, eNB2 1015).

Figure 10B:
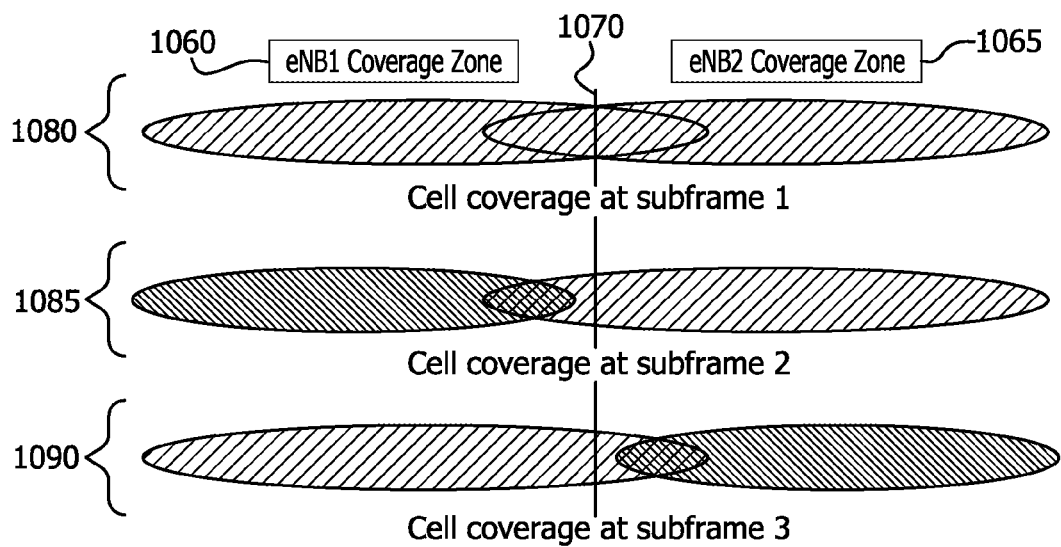
FIG. 10B shows another example of using antenna beam tilting to create cell coverage zones.

FIG. 10B shows another example 1050 of using antenna beam tilting to create cell coverage zones. FIG. 10B shows the eNB1 1010 Coverage Zone 1060 and the eNB2 1015 Coverage Zone 1065 for each of a plurality of subframes. More specifically, FIG. 10B shows the coverage for a first subframe (subframe 1) 1080, a second subframe (subframe 2) 1085, and a third subframe (subframe 3) 1090 with respect to eNB1 1010 and eNB2 1015. The vertical line may indicate a cell-edge location 1070 of the first subframe 1080.

During subframe 1 1080, both eNB1 1010 and eNB2 1015 may transmit data with small antenna beam down-tiling angles 1025. In this example, the Coverage Zones 1060, 1065 of eNB1 1010 and eNB2 1015 may overlap. This may create interference between eNB1 1010 and eNB2 1015. Specifically, this may create interference at the cell-edge location 1070. During subframe 2 1085, eNB1 1010 may use a large antenna beam down-tilting angle, for example, shifting coverage towards its cell center. This may reduce interference to eNB2 1015. Specifically, this may create reduced interference at the cell-edge location 1070. During subframe 3 1090, the situation may be the opposite as compared to subframe 2 1085, whereby eNB2 1015 may use a large antenna beam down-tiling angle, for example, shifting coverage towards its cell center. Thus, this may reduce interference to eNB1 1010. Specifically, this may create reduced interference at the cell-edge location 1070.

Based on the Coverage Zones 1060, 1065 and subframes 1080, 1085, 1090, a WTRU located at the cell-edge location 1070 between eNB1 1010 and eNB2 1015 may receive strong inter-cell interference during subframe 1 1080, regardless of its serving eNB (eNB1 1010 or eNB2 1015). However, during subframe 2 1085, if the WTRU receives data from eNB2 1015, the interference from eNB1 1010 may be reduced. This may result in improved SINR. SINR may also be improved during subframe 3 1090, if the WTRU switches its serving cell to eNB1 1010 from eNB2 1015.

One or a combination of the following operation options may be used. The network may not enable a WTRU to switch its serving cell at subframe rate. In this option, the network may preselect the candidate subframes for which a WTRU may be potentially assigned for data transmission. The assignment may be performed, for example, according to the pre-determined antenna beam down-tilting patterns of the serving and neighbor cells. In the example described in FIGS. 10A-B, for a cell-edge-WTRU that is associated with eNB1 1010, subframe 3 1090 may be the candidate subframe. The network may direct the WTRU to feedback CSI for those candidate subframes to minimize feedback overhead. Based on the CSI feedback, the network may decide to allocate certain subframes to the WTRU.

Alternatively or additionally, the network may allow a WTRU to switch its serving cell at a subframe rate. In this option, a WTRU may be associated with multiple cells (both eNB1 1010 and eNB2 1015 in FIG. 10A), and the WTRU may change its serving eNBs on a per-subframe basis. This may be performed according to the antenna beam-tilting pattern. To support such operation, the eNB for which CSI is associated may be different from subframe to subframe. In the example described in FIGS. 10A-B, for data transmission on subframes 2 and 3 1085, 1090, the WTRU may feedback the CSI associated with eNB2 1015 and eNB1 1010, respectively. The WTRU may be instructed by the network (for example, via explicit signaling) regarding which CSI should be used as feedback. Alternatively or additionally, the WTRU may be signaled a set of antenna tilting patterns for surrounding cells, and the WTRU may decide the CSI feedback content on its own.

There may be multiple ways to implement STS and/or LTS. One option is a "non-selective" antenna beam-tilt implementation. In this example, all channels (such as, for example, CRS, CSI-Reference Signal (CSI-RS), PDCCH, PDSCH, and the like) within a subframe share a single down-tilting pattern angle. With proper network configuration, the antenna pattern down-tilt may appear transparent to WTRUs with reference symbols being transmitted while the antenna beam pattern is down-tilted in the same manner as user data. Potential negative impact to legacy WTRUs may be mitigated by network configuration and scheduling. For example, allocation of legacy WTRUs may be limited to subframe 1 1080 in the example shown in FIGS. 10A-B.

Alternatively or additionally, a "selective" antenna beam-tilt implementation may be used. In this example, down-tilting angles for the PDSCH may vary from subframe to subframe. Other channels may be transmitted with a same down-tilting angle. With "selective" antenna beam-tilt, continuality of cell-specific reference symbols such as CRS or CSI-RS may be maintained and a standard method for WTRU channel estimation and CSI feedback may be applied. However, additional adjustment may be performed at either a WTRU or eNB to reflect the difference between cell-specific reference symbols and PDSCH. A subset of CSI, channel quality indicator (CQI), may represent the quality of the "effective channel" experienced by data channel PDSCH, where the "effective channel" may not only include the RF propagation channel, but may only include the effect of transmitter and receiver process, such as, for example, transmitter power allocation and precoding. If reference symbols used for CQI calculation go through the same process as PDSCH, CQI calculated from reference symbols may be directly applied to PDSCH. However, if there is a difference between the two, the CQI calculated from reference symbols may be adjusted.

According to one example, antenna pattern down-tilting may be performed as a form of beamforming in elevation. The down-tilting angle may be associated with a set of pre-determined antenna weights. For the WTRU to feedback proper CSI and to demodulate data, the antenna weights and the pattern of antenna weights usage may be signaled to the WTRU. After the WTRU obtains channel estimates from reference symbols, it may convert the channel estimates to an antenna pattern down-tilted version. This may be performed, for example, by multiplying the channel matrix with proper antenna weights. This may be performed before a CSI feedback or data demodulation process begins. The subframe scheduling strategy described herein for LPS may apply to "selective" antenna beam-tilting implementation. Selective antenna beam-tilting may be performed by replacing LPS with STS and LTS with a normal subframe in any of the examples described herein.

Similarly with LPS implementation, PDSCH power allocation may vary from subframe to subframe. CQI calculation may take the power variation into account. In LTE, for example, the power ratio between PDSCH resource element (RE) and reference symbol RE may be signaled to a WTRU. Depending on the location of the PDSCH RE, the ratio may be different even without considering LPS/ABS: if the PDSCH RE locates in an OFDM symbol that carries CRS, the ratio may be denoted as $\rho_B$, otherwise, the ratio may be denoted as $\rho_A$. Both $\rho_B$ and $\rho_A$ may be user-specific parameters. If LPS is introduced, additional cell-specific parameters may be signaled. For example, a set of power boosting parameter $\alpha(i)$, in conjunction with the LPS pattern, may be signaled to a WTRU. The parameter $\alpha(i)$ may represent the power ratio between a LPS and a non-LPS subframe.

DL data throughput may be improved via any of the examples described herein. The DL performance may be compared in terms of throughput and effective SINR (eS-INR). The eSINR may be defined as the SINR that may need to achieve the same average throughput over one period of the LPS pattern in which the SINR may be changing on a per TTI basis, according to the pattern. To compute an eSINR, the SINR experienced by the WTRU may be calculated in each TTI. The SINR in each TTI may depend on the cell that the WTRU connects to during that TTI. The SINR may be mapped in each such TTI into an achievable throughput using Shannon capacity. The achievable throughput in each TTI may be summed and the result may be mapped back into the eSINR. Specifically, assuming a single carrier frequency with the same bandwidth for each cell, the eSINR may be expressed as:

$$eSINR = 2^{\Sigma_n log_2(1+SINR_n)/N} - 1, \quad \text{Equation (1)}$$

where n may be the index of the LPS pattern, N may be the length of the unique pattern, and $SINR_n$ may be the linear SINR seen by the WTRU in TTI n.

Figure 11:
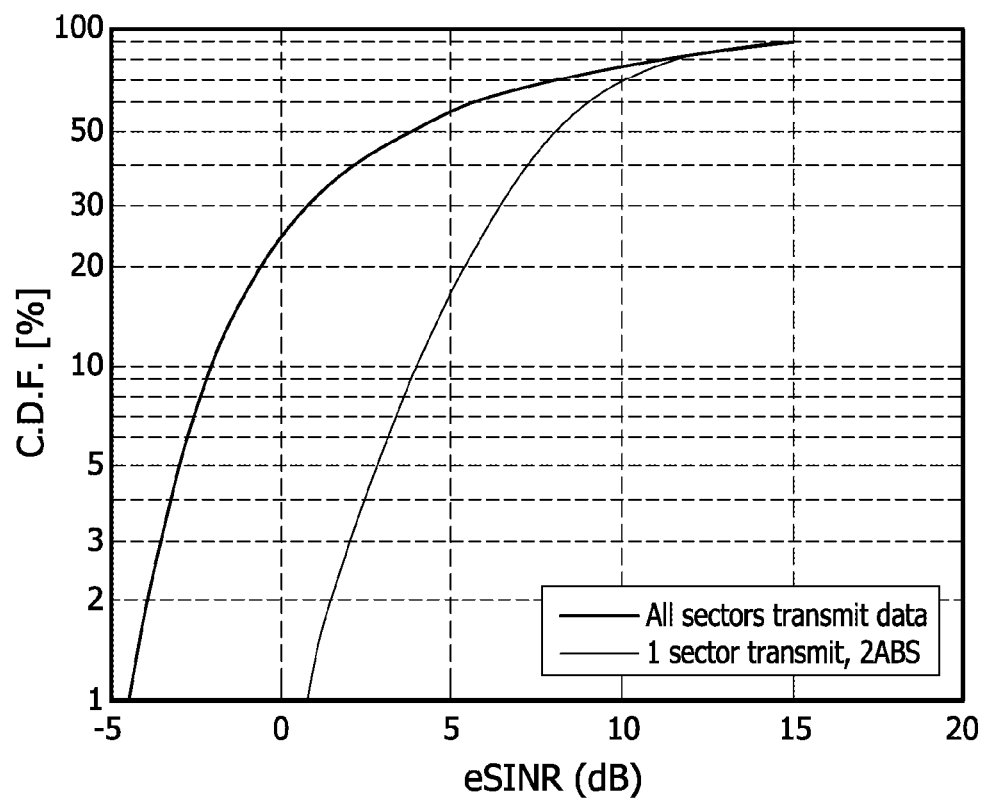
FIG. 11 shows an effective SINR (eSINR) Cumulative Distribution Function (CDF) comparison.

FIG. 11 shows the eSINR Cumulative Distribution Function (CDF) comparison of a multi-flow LPS system (with power adjustment equal to BS Tx power) to a baseline without multi-flow and LPS in a 3 sector site macro deployment. Each site in the multi-flow LPS system may use LPS in 2 out of 3 subframes and the patterns may be staggered such that there is one normal subframe within a cluster of three cells in each TTI. FIG. 11 shows that 70% of the WTRUs in the system may have a clear eSINR gain. A 7 dB gain may be observed for a 10 percentile edge-WTRU.

Figure 12:
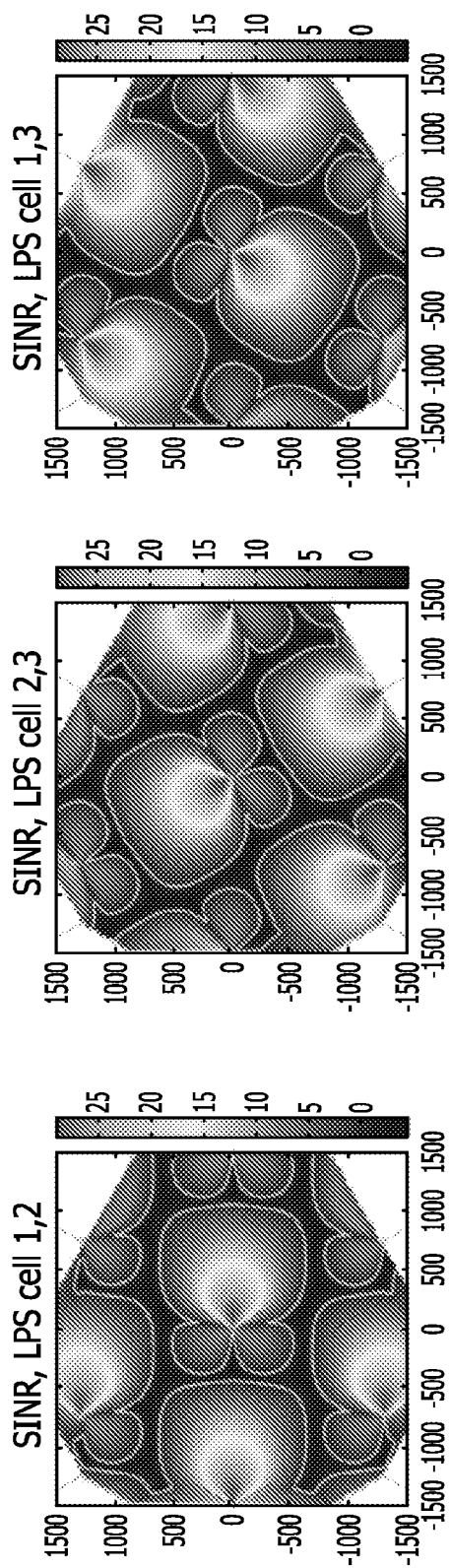
FIG. 12 shows an example of SINR density shift on a coverage area in a transmission time interval (TTI) in which LPS is applied.

FIG. 12 shows an example of SINR density shift on the coverage area in the TTI for which LPS is applied. In this example, each edge-WTRU may receive data during an LPS TTI from one cell at a higher SINR. In general, for the multi-flow LPS case, the WTRU may be enabled to receive from more than one cell in a TTI. In a multi-flow LPS case, the cell that the WTRU receives data from may change from TTI to TTI.

The SINR gain may not translate directly into system throughput gain. With full buffer traffic, there may be substantial gain in the cell-edge TP. This gain may come at the cost of peak cell-throughput. However, full buffer traffic may not be a common scenario. A more typical cellular macro deployment plan may optimize for a maximum resource utilization of, for example, 50%. The SINR gain may be partly indicative of performance gain for cells that are not fully loaded. The fuzzy cell allows for borrowing resources from neighbor cells that are not utilized for the subframe. This was shown, for example, in Type 1 and Type 2 subframes described above. Table 1 shows example simulation results applying an FTP traffic model for two different traffic loads. The performance may indicate that a deployment that utilizes LPS may have higher effective average and cell-edge throughput.

TABLE 1

| Data Tx. Cell | LPS Cells | effective average TP | effective 10% TP | Traffic Load |
|---|---|---|---|---|
| 3 | 0 | 15.6 Mbps | 4.5 Mbps | Low |
| 1 | 2 | 23.2 Mbps | 11.3 Mbps | Low |
| 3 | 0 | 12.1 Mbps | 3.5 Mbps | High |
| 1 | 2 | 17.5 Mbps | 8.6 Mbps | High |

The examples described herein may also apply to UL transmission. A TDM Fuzzy Cell may be implemented with LPS and/or LTS/STS multi-flow. This may enable WTRUs to access multiple cells, for example, on the same carrier frequency. Usage of LPS may also place limitations on UL control signaling required in supporting multi-site DL data transmission. In a 3GPP cellular system, the UL transmission, with the possible exception of a contention based access (for example, the random access channel (RACH)) may be controlled by an eNB. The medium access control (MAC) scheduler may coordinate available radio resources to a WTRU for UL transmission. This may include control signaling or data transmission. A MAC scheduler may consider the UCI schedule described herein if scheduling on the PDCCH.

UCI may be scheduled in one or more of the following ways. CSI/HARQ processing may be used. One HARQ entity may process the HARQ acknowledgement (ACK)/negative acknowledgement (NACK) per cell. The LPS and/or LTS/STS pattern selection at each cell may consider alignment with or to a neighbor cell LPS and/or LTS/STS, such that DL data transmission to an edge-WTRU may occur during the neighbor LPS and/or LTS/STS period. This may optimize DL TP rate and may have advantages for UCI signaling. For example, this may limit cell reception error, thereby avoiding redundant retransmission due to incorrect ACK decoding. The ACK/NACK UL transmission of a close-by-WTRU to respective individual cells may be separated in time. Therefore, better transmission quality may be the result of reduced noise. If a WTRU does not transmit on multiple PUCCHs to different cells at the same time, a cell specific TA may be applied to ACK/NACK signaling on a dedicated PUCCH to the targeted cell.

Figure 13:
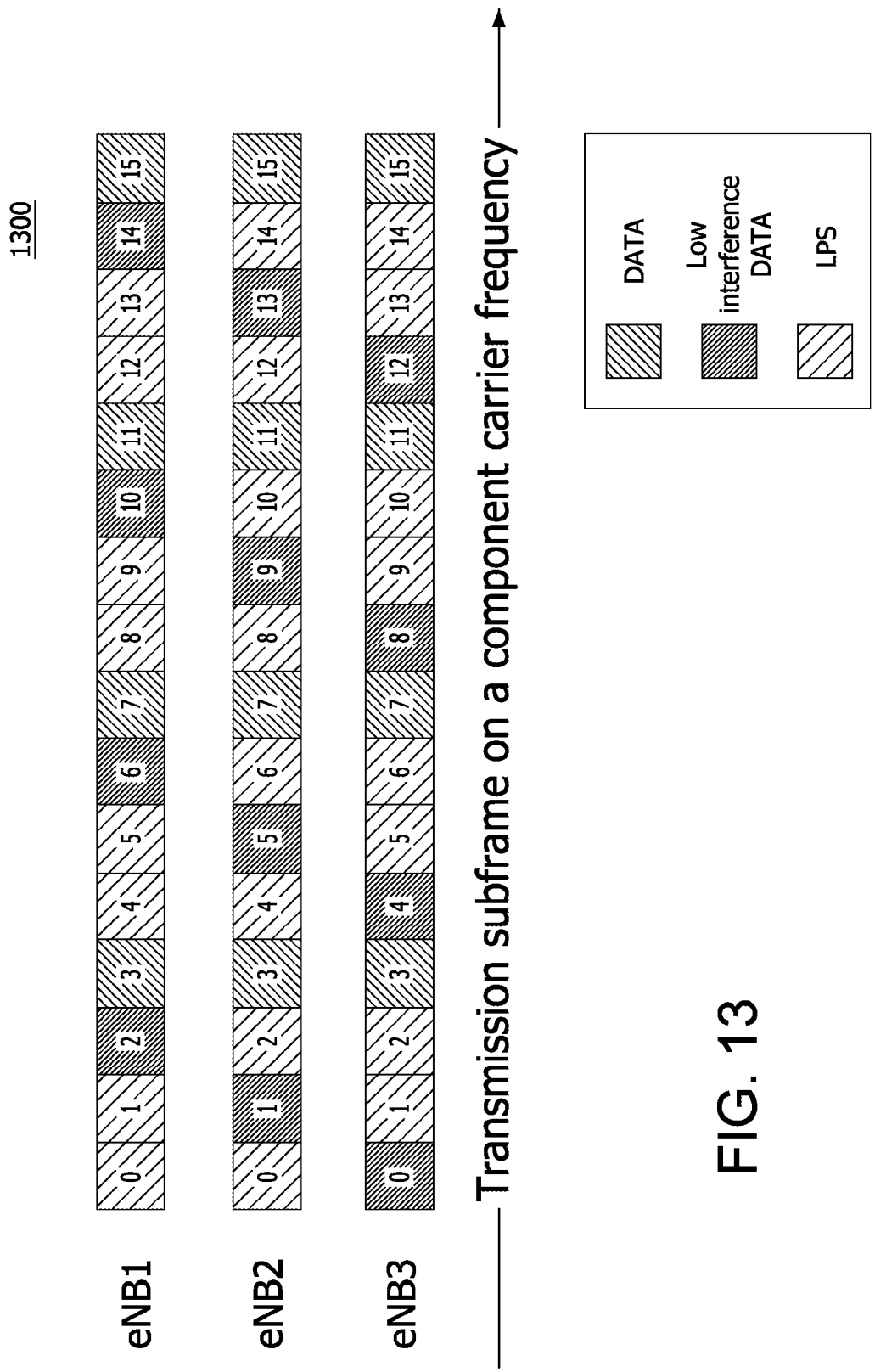
FIG. 13 shows an example of LPS patterns being applied to a cluster of multiple cells.

FIG. 13 shows an example 1300 of LPS patterns being applied to a cluster of three cells. Each cell may be associated with a respective eNB: eNB1 1310, eNB2 1320, and eNB3 1330. A WTRU (not shown) located in a region central to the three eNBs 1310, 1320, 1330 may receive data from each eNB 1310, 1320, 1330 over one period of the LPS pattern. For example, the WTRU may receive from all three eNBS 1310, 1320, 1330 on at least each of the subframes shown as "low interference data" in FIG. 13. The subframes shown as "data" may appear to be a normal frequency or subframe as described herein. The WTRU may receive data from one of the eNBs during a subframe shown as a "data" subframe. The particular eNB chosen may be the eNB that provides the highest SINR in that subframe.

Figure 14:
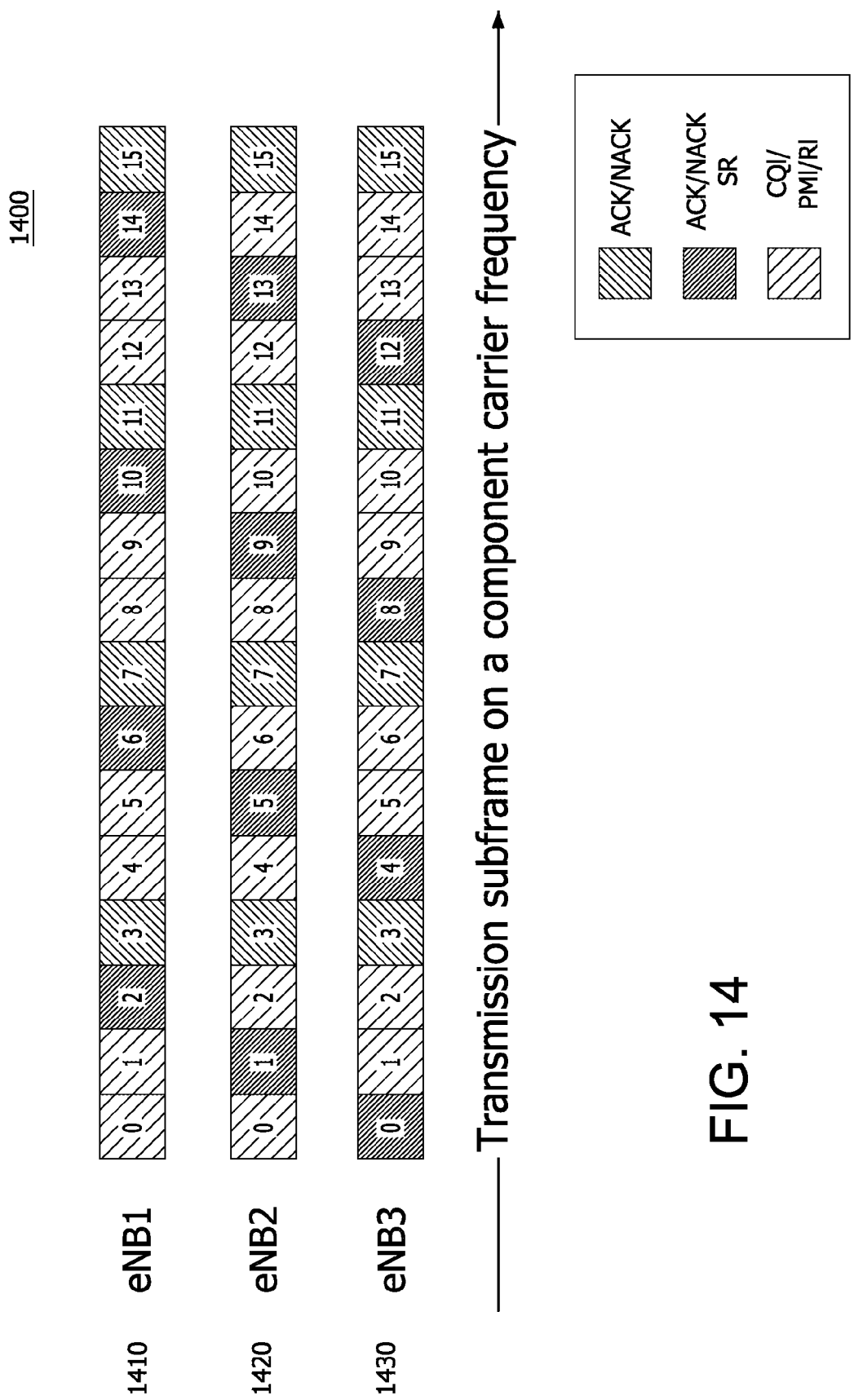
FIG. 14 shows an example of uplink control information (UCI) assignments for multiple eNBs.

FIG. 14 shows an example 1400 of UCI scheduled by eNBs corresponding to the LPS pattern assigned. FIG. 14 shows eNB1 1410, eNB2 1420, and eNB3 1430. FIG. 14 also shows subframe patterns for each of the eNBs 1410, 1420, 1430 with respect to ACK/NACK, ACK/NACK scheduling request (SR), and CQI/PMI/RI subframes. For backward compatibility, an ACK/NACK may be sent back 4TTIs after each allocation. This may imply that ACK/NACK feedback for each eNB 1410, 1420, 1430 may be concentrated in subframes 4TTIs after the "low interference data" subframe for each eNB as shown in FIG. 13. Accordingly, the "ACK/NACK and/or SR" subframes in FIG. 14 correspond to the low interference data" subframes in FIG. 13. The Scheduling Request (SR) may be used by a WTRU to request UL resources while the ACK/NACK may be the WTRU feedback for DL data transmission. To balance this effect, CSI (for example, CQI/PMI/RI) feedback may be scheduled in the other subframes. The subframe designated for CSI scheduling may be limited, as shown by the CQI/PMI/RI subframes in FIG. 14. Each eNB may choose to configure the CSI in the same subframe for ACK/NACK or SR transmission if advantageous subframe scheduling may result in scheduling CSI signaling on multiple PUCCHs to the respective sites. The WTRU supporting LPS may transmit UCI on the PUCCH to its serving eNB, optionally instead of transmitting on the PUCCH to the primary cell.

A WTRU configured with simultaneous PUSCH/PUCCH may choose to send an ACK/NACK on either the PUSCH or PUCCH, which may be associated with the DL data transmission site. Alternatively or additionally, a WTRU may choose to send each of the ACK/NACKs to one site (for example, a primary site). The ACK/NACKS may be relayed over an X2 interface. This may be limited by the transmission speed of the network backhaul deployment.

A WTRU may maintain dedicated Timing Advance (TA) for each active cell because the physical distance to each connected cell on the carrier frequency may be different. The TA procedure may maintain the TA for each active cell. Each scheduling eNB may provide the TA adjustment of the respective path to the primary eNB. The primary eNB may use an individual path TA to determine a common TA (CTA) and may signal the CTA to the WTRU and/or all serving eNB(s). The WTRU may use CTA instead of (or in addition to) individual path TA for signaling to multiple sites. For example, the WTRU may use CTA for transmitting an ACK/NACK to multiple sites corresponding to Type 3 subframe normal DL data transmission from multiple sites. The WTRU may also use CTAQ for CQI reporting in the same UL subframe as an ACK/NACK or CQI reporting for different sites.

The WTRU may consider which TA to use for transmitting to respective sites. In the case of a transmission timeline overlap due to a different TA for each site (for example, transmission to eNB2 may be indicated to start before transmission to eNB1 has completed) one or a combination of the following examples may be used. The WTRU may truncate samples. If a delta between a target TA is within the boundary of Cyclic Prefix (CP) protection, the transmission to one site may take priority over the transmission to the other site(s) such that one transmission may end early or the other one may start late. A combination is also possible, whereby a smaller amount of each transmission may be removed.

The WTRU may also perform symbol removal. If a delta between a target TA is exceeding the boundary of CP protection, the last symbol of the earlier subframe may not be punctured, thereby creating a smaller subframe with less data. Alternatively or additionally, the first symbol of the later subframe may be punctured. The same CP may be applied.

The WTRU may operate in a compressed mode. If a delta between a target TA is exceeding the boundary of CP protection, the data maybe compressed into fewer symbols. This may create a smaller subframe as described above, but this may include potentially different coding, modulation, and/or transmission power. The WTRU may perform transmission overlap. The transmissions may overlap with transmission power optionally limited to $P_{overlap\_max}$ in the overlap region.

The cooperating eNBs may exchange a CSI reporting configuration over an X2 interface during initial RRC configuration and/or at the point of handover (HO). The scheduling eNB may uses the LPS and/or LTS/STS pattern and/or CQI reporting information to determine whether there is a multi-site UL transmission for individual subframes. The CTA may be used to determine the WTRU UL transmission option for subframes for which multiple site transmission is determined.

CTA may be determined in one or more of the following ways. TA may be obtained by a WTRU on a WTRU-eNB radio path. This may be determined initially by a transmission on a RACH during initial RRC Connection establishment and/or during a HO procedure. If WTRU establishes the initial TA value, subsequent adjustment on an active channel may be signaled by the respective eNB using MAC TA control element (CE). For the purpose of CTA calculation, each cooperating eNB may provide the TA adjustment value to the primary eNB. The primary eNB may use the primary cell TA value as the reference point in CTA determination. The maximum and minimum TA adjustment relative to the reference TA may be used to select the CTA value. The CTA value may not exceed the CP length on all TA paths. In a synchronized network, the adjusted TA value may be used directly in the CTA determination. For a non-synchronized network, the delta time between a primary cell receive synchronization clock relative to the synchronization clock of another cell may be added to the respective cell TA for the purpose of CTA selection.

The CTA may be signaled to the WTRU from the primary cell via a MAC CE. A new TA CE may be used or the reserve bit in the existing TA may be used to indicate that the TA value included is CTA. The CTA adjustment may be applied to the absolute TA value of the primary cell path for UL signaling to multi-cells.

Power control may be performed in one or a combination of the following ways. For the same reason as TA, a separate power control loop for different physical channels (for example, the PUSCH, PUCCH, or the like) may need to be maintained for each active cell. In one example, the UCI may be transmitted to one cell in any TTI. Thus, one power control loop may be needed at a time for PUCCH signaling without UL data transmission to both cells. The pathloss measurement as well as the receive power for the power control may consider different LPS and/or LTS/STS patterns. The WTRU may report measurements using any of the options described herein, based on the network configuration. The UCI may be transmitted to all cells. Therefore, the power control loop for a distance site may be applied only to the PUCCH. The power control loop for a closer site may be used to control the PUCCH as well as the PUSCH transmissions.

Cell Selection, re-selection, and/or adding or removing eNBs may be performed in one or a combination of the following ways. The network may maintain a list of cells that support LPS and/or LTS/STS and/or the respective configured patterns using, for example, an X2AP load indication message. If the serving eNB that supports LPS and/or LTS/STS detects high interference from the neighboring eNBs, the serving eNB may send the WTRU a new measurement configuration with the LPS and/or LTS/STS pattern for neighboring eNBs. The WTRU may use this information to measure them and decide if they can be added to a set of "cooperating eNBs." A CC-HO procedure as described herein or performed with respect to fuzzy cells may be used to initiate data-splitting across sites.

Cell-specific reference signal (CRS) measurements may be performed for LTS/STS. For a WTRU measurement, the CRS transmission may not be affected by the application of LPS. This may also be true for LTS/STS if selective antenna beam tilting implementation is used. For example, the CRS transmission angle may not be affected by the tilting. If tilting is applied to all channels (for example, non-selective antenna tilting) or CRS, a cell-edge-WTRU may observe a discontinuity in signal strength during LTS and STS transition. This may cause perceived radio signal degradation (for example, if averaged) or even a lost signal. This may cause, for example, unintended triggering of handover or radio link failure recovery.

The network may configure the WTRU to perform measurements on either LTS or STS. This may avoid undesired measurement reporting to eliminate unintended signal degradation. The WTRU may re-use an existing RRC configuration, such as, for example, a specific subframe for RSRP/RSRQ measurement introduced by eICIC (such as ABS) or a similar method. Limited specification and control may be imposed on the measurements for some or all WTRUs. For example, legacy WTRUs may have limited specification and control regarding the measurements. For example, RSRP and RSRQ measurement may have to meet a specified measurement accuracy, but the duration and sample sizes may not be required to meet particular conditions. The network may configure the WTRU to perform measurement only on a non-tilting (subframe) interval or filtering (for example, using a longer time to trigger an interval to obtain additional measurement samples of the SINR of the monitoring cells for HO events) such that the measurement degradation due to switching of transmitting frame type may be averaged out against normal (or improved) measurement samples over the monitoring (duration) time.

CQI and channel estimation are other features of a WTRU that may require adjustments if performed using CRS on both LTS and STS. A network may configure the WTRU to perform these functions using CSI-RS. CRS may be used for demodulation of the PDCCH and PDSCH (optionally, with the exclusion of port5) and the WTRU may assume that the CRS transmission characteristics are, for example, static or semi-static. A typical implementation may exploit this by using multiple subframes worth of CRS to perform channel estimates. For example, channel estimates may be performed by averaging over a plurality of subframes and may be required to meet RAN4 requirements. By introducing discontinuities in CRS, the channel estimates may be degraded for some period of time after each transition. The CRS may be used for CQI estimation and reporting. The reference measurement resources may be contained in a single sub-frame. The WTRU may not be precluded from using other signals from outside the reference measurement resources. To address a potential CQI/channel estimation error, the network may assume or estimate measurement degradation and may apply an offset during scheduling to compensate for the loss due to discontinuity in CRS transmission.

The WTRU may perform radio link monitoring (RLM) to report the status of link health. In-/out-of-synch monitoring may be performed on the primary cell. For ICIC, a measurement resource restriction pattern (for example, Pattern 1) may be configured in the WTRU to restrict the RLM measurements of the serving cell to the corresponding LPS and/or LTS/STS pattern. In the case of TD-fuzzy cells, this may not provide the latest status on each of the serving cells' radio statuses if both LPS and/or LTS/STS and normal data subframe are used. This may allow one or more options for a WTRU on the subframes chosen to monitor CRS for the purpose of in- and out-of-synch determinations. For the TD-fuzzy cells, following RLM options for primary and non-primary serving cells may be configured by network.

For example, monitoring may be performed on the primary cell. The WTRU may monitor the in-sync and out-of-sync on primary cell. Using this approach, the WTRU may not properly report RLF if both LPS and/or LTS/STS and normal subframes are used for data transmission. For example, if the WTRU is experiencing in-sync during neighbor LPS and/or LTS/STS and out-of-sync during normal data subframe due to increased interference with data and control frame transmission from a neighbor, the WTRU may not be able to detect an error on a normal subframe. This may be due to the in-sync from a specific LPS and/or LTS/STS pattern interleaving in the stream of out-of-sync indication. If measurement resource restriction is applied to measure RLM only on a normal subframe, this may result in RLF causing the network to perform HO. If the RLM is measuring only LPS or LTS, out-of-sync may be ignored. This may cause the WTRU to end up with excessive retransmission due to reception error in a non-LPS frame.

The WTRU may monitor the in-sync and out-of-sync on the primary cell using measurement restriction where in-sync and out-of-sync monitoring may only use measurements taken on non-primary LPS, for example, the measurement taken on subframes in which the primary cell is transmitting at normal power and neighbor cells are using LPS. A separate counter may be maintained for tracking if neighbors are also transmitting data and when a neighbor is using LPS. This approach may solve the potential problem associated with two (or more) cells being aggregated, as described above. If the WTRU is aggregating multiple cells (for example, three or more), neighbor interference if one or two serving cells are transmitting may be different and may result in different in-/out-of-sync issues as described above.

The WTRU may monitor the in-sync and out-of-sync on a primary cell for all subframes types with a separate counter. For example, a counter may be used for (1) a normal data frame (2) a neighbor LPS; and/or (3) a primary LPS. This may increase the duration of time it may take for the WTRU to reach the out-of-sync count. This delay may be accommodated by modifying (for example, adding a new information element (IE)) the reporting configuration (for example, N310/311 and T310/T311) for RLF detection for each type separately. This may accommodate the differences in the ratio of normal data subframes versus LPS of the cell LPS pattern. This may provide a detailed tracking of primary cell status in each type of subframe. The WTRU may report individual subframe-type RLF. This may require a new IE in the RLF cause value.

One or a combination of the following measurement configuration modifications may be performed. A new IE may be added in an RRC message. A new IE (for example, called Adjust TimersAndConstants) may be included while configuring the WTRU TimersAndConstants IE, for example, the ue-TimersAndConstants IE or the RadioResourceConfigDedicated IE. The AdjustTimersAndConstants may include a No LPS indication or an LPS indication. The AdjustTimersAndConstants may include an Ignore indication. Alternatively or additionally, the measSubframePattern-Serv-r10 may be modified. For example, the measSubframePattern-Serv-r10 may be extended to a list. The measSubframePattern-Serv-r10 may include a physical cell ID for each subframe pattern listed. The measSubframePattern-Serv-r10 may provide identification of multiple subframe patterns per cell.

One or a combination of the following measurement reporting modifications may be performed. A new RLF cause value may be added to the RRC message "Measurement Report." A new IE (for example, "RLF on cell," which may include a Physical ID) may be included in "Measurement Report." The new IE may include the following options for failure cause: (1) only normal data transmit frame; and/or (2) normal and neighbor LPS.

Monitoring may be performed on the non-primary serving cell. The WTRU may follow not configure monitoring on a serving cell. The WTRU may monitor in-sync and out-of-sync on active non-primary serving cells using a separate counter on LPS to maintain serving cell RLM as described above. In the case of CA, RLM may be performed on at least one serving cell from each cooperating site.

To facilitate RLM from multiple sites, a single CC or a subset of CCs may be designated to perform RLM. This may be referred to as a RLM set. Fuzzy cell deployment may assume aggregation across at least two cooperating sites. To prevent RLF, a minimum of one CC from each site (called "per-site-primary CC") may be a part of the RLM set. Per-site-primary CCs in the RLM subset may have one or more of the following characteristics. Per-site-primary CCs may never be deactivated. In the presence of cross-carrier scheduling, at least the per-site-primary CCs support PDCCH configuration for the WTRU to monitor. Per-site-primary CCs may be associated with an UL carrier to allow RACH procedures.

The RLM set may be explicitly configured or implicitly derived by the WTRU. For example, the WTRU may search a WTRU-specific PDCCH search space for DL-non primary CCs. If the RLM set is implicitly derived, a RLM reporting set may be required to be sent to the primary eNB. The WTRU may generate a RLM report to indicate the CCs that are detected as out-of-sync. It may be assumed that each CC maintains its unique in-sync and out-of-sync timers and counters. The secondary cells that have been detected as failed may be considered in a particular state. For example, this state may be called "Scell disabled" or "Scell fail." In the RLM report, in addition to failed CC report, the WTRU may report the signal strength of all carriers.

The WTRU may signal a Radio Link out-of-sync condition. Using the UL signaling methods described herein, the MAC may transparently route RRC messages to the available grant on any uplink carrier. The MAC entity in the cooperating eNBs may route all packets to the primary eNB. Alternatively or additionally, all messages may be directly transmitted to the primary (serving) eNB. To transmit the RLM report, the WTRU may need to request an uplink grant by transmitting a scheduling request (SR). The SR may be transmitted on the PUCCH of the UL carrier paired with an in-sync DL non-primary carrier. Alternatively or additionally, a RACH procedure may be applied to generate the SR, for example, if there is no current grant. The RACH procedure may not be required if another primary carrier exists in the cell for which there is no radio link problem and for which there is a grant on the carrier. Alternatively or additionally, contention-free RACH may be allowed using particular parameters (for example, a preamble) configured by the eNB through a non-primary DL CC.

One or a combination of the following recovering methods may be used. If a RLF is detected on a site, a handover may be used to restore or establish a new link for recovery, with minimum impact on the rest of working links. An intra-site HO may be used. Further, if intra-site HO is used, a partial MAC reset may be applied for the concerned DL carrier and the HARQ processes associated with this DL carrier may be flushed. The same may apply to any UL carrier for which transmissions are stopped and resources are released. An additional impact of losing a DL CC may be that the data-splitting entity at the primary eNB may need to be reconfigured to change the ratio of traffic synched locally to traffic forwarded over an X2 interface to cooperating sites. The reconfiguration may be performed by, for example, performing updated admission control with the cooperating eNBs via X2 messaging.

If the primary eNB determines that inter-site HO is required, the primary eNB may initiate HO preparation by negotiating a handover request and/or response with the target eNB. The RRC HO command may then be relayed over an X2 interface, to be sent to the WTRU. An uplink connection may already exist with the target eNB, in which case the RRC connection reconfiguration complete message may be sent to the target eNB. Alternatively or additionally, a RACH procedure may be required to communicate with the target eNB to trigger synchronization and/or obtain uplink allocation. The target eNB may be required to initiate a Path Switch Message and Context Release to complete the HO procedure. If a single uplink connection is used, implicit RLF detection at the primary eNB may trigger handover to a cooperating site, and the WTRU may be required to perform a RACH procedure, request or receive a new UL allocation, and/or perform synchronization/timing advance with the cooperating eNB.

The eNB may maintain the LPS pattern used by the neighbor cell and may match the subframe type used for the CQI measurement. The WTRU may maintain separate tracking for CQI received on different subframe types, for example, for reference if scheduling radio resources for the WTRU.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU) comprising:
a processor;
a transmitter; and
a receiver,
the processor and the receiver configured to:
receive, from a first base station (BS), a first medium access control timing advance control element (MAC TA CE) that indicates a first timing advance adjustment value;
receive, from a second BS, a second MAC TA CE that indicates a second timing advance adjustment value;
the processor and the transmitter configured to:
determine, based on the first timing advance adjustment value, a first timing advance for transmitting to the first BS;
determine, based on the second timing advance adjustment value, a second timing advance for transmitting to the second BS;
determine, based on the first timing advance and the second timing advance, an overlap between transmission times of a first physical uplink shared channel (PUSCH) transmission to the first BS and a second PUSCH transmission to the second BS; and
send the first PUSCH transmission to the first BS and the second PUSCH transmission to the second BS, wherein a first transmission power of the first PUSCH transmission or a second transmission power of the second PUSCH transmission is reduced in at least one portion of the overlap prior to transmission so that a total transmission power of the first PUSCH transmission and the second PUSCH transmission does not exceed a maximum transmission power, wherein the first PUSCH transmission and the second PUSCH transmission start at different times.

2. The WTRU of claim 1, wherein the first transmission power of the first PUSCH transmission is prioritized over the second transmission power of the second PUSCH transmission to reduce the total transmission power in at least one portion of the overlap.

3. The WTRU of claim 1, wherein the processor and the receiver are further configured to receive scheduling information from the first BS and independently receive scheduling information from the second BS.

4. The WTRU of claim 1, wherein a data flow is split between the first PUSCH transmission and the second PUSCH transmission.

5. The WTRU of claim 1, wherein the processor and the receiver are further configured to simultaneously monitor for timing adjustment information from the first BS and the second BS.

6. A method for use in a wireless transmit/receive unit (WTRU), the method comprising:
receiving, from a first base station (BS), a first medium access control timing advance control element (MAC TA CE) that indicates a first timing advance adjustment value;
receiving, from a second BS, a second MAC TA CE that indicates a second timing advance adjustment value;

determining, based on the first timing advance adjustment value, a first timing advance for transmitting to the first BS;

determining, based on the second timing advance adjustment value, a second timing advance for transmitting to the second BS;

determining, based on the first timing advance and the second timing advance, an overlap between transmission times of a first physical uplink shared channel (PUSCH) transmission to the first BS and a second PUSCH transmission to the second BS; and sending the first PUSCH transmission to the first BS and the second PUSCH transmission to the second BS, wherein a first transmission power of the first PUSCH transmission or a second transmission power of the second PUSCH transmission is reduced in at least one portion of the overlap prior to transmission so that a total transmission power of the first PUSCH transmission and the second PUSCH transmission does not exceed a maximum transmission power, wherein the first PUSCH transmission and the second PUSCH transmission start at different times.

7. The method of claim 6, wherein the first transmission power of the first PUSCH transmission is prioritized over the second transmission power of the second PUSCH transmission to reduce the total transmission power in at least one portion of the overlap.

8. The method of claim 6, further comprising receiving scheduling information from the first BS and independently receive scheduling information from the second BS.

9. The method of claim 6, wherein a data flow is split between the first PUSCH transmission and the second PUSCH transmission.

10. The method of claim 6, further comprising simultaneously monitoring for timing adjustment information from the first BS and the second BS.

* * * * *